(12) United States Patent
Bloom et al.

(10) Patent No.: US 7,940,448 B2
(45) Date of Patent: *May 10, 2011

(54) DISPLAY SYSTEM

(75) Inventors: David M Bloom, Jackson, WY (US); Matthew A Leone, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,686

(22) Filed: Jun. 11, 2009

(65) Prior Publication Data

US 2010/0315565 A1  Dec. 16, 2010

(51) Int. Cl.
*G02F 1/01* (2006.01)
*G02B 26/00* (2006.01)

(52) U.S. Cl. ......... 359/276; 359/238; 359/279; 359/290

(58) Field of Classification Search .................. 359/279, 359/245–246, 254, 259, 264, 247, 263, 278, 359/269, 271, 315–316, 318, 290–291, 295, 359/230–231, 237–238, 240, 267, 298, 649

See application file for complete search history.

(56) References Cited

U.S. PATENT DOCUMENTS

| | | | | |
|---|---|---|---|---|
| 4,013,338 A * | 3/1977 | Sato et al. | .................. | 359/29 |
| 4,523,234 A | 6/1985 | Sangu | | |
| 5,861,964 A * | 1/1999 | Hasegawa et al. | .............. | 359/18 |
| 6,411,425 B1 | 6/2002 | Kowarz et al. | | |
| 6,922,277 B2 * | 7/2005 | Moon et al. | .................. | 359/298 |
| 2003/0007156 A1 | 1/2003 | De Groot et al. | | |
| 2006/0238851 A1 * | 10/2006 | Bloom | .................. | 359/279 |
| 2007/0046790 A1 * | 3/2007 | Nakasuji et al. | ........... | 348/226.1 |
| 2007/0153235 A1 * | 7/2007 | Morikawa et al. | ............. | 353/20 |
| 2008/0165358 A1 | 7/2008 | Engelhardt | | |
| 2010/0225992 A1 * | 9/2010 | Askebjer et al. | ............. | 359/291 |

OTHER PUBLICATIONS

Jose E. Oti et al., The Optical Differentiation Coronagraph, The Astrophysical Journal, v. 630, p. 631-636, Sep. 1, 2005.
Steven K. Case, Fourier processing in the object plane, Optics Letters, v. 4, p. 286-288, Sep. 1, 1979.
Carole C. Montarou et al., Analysis and design of modified Wollaston prisms, Applied Optics, v. 38, p. 6604-6616, Nov. 1, 1999.
S. Mallick et al., Spatial Differentiation by a Lateral Shear Interferometer, Applied Optics, v. 11, p. 479-480, Feb. 1, 1972.
Lei Wu et al., Analysis of the lateral displacement and the optical path difference in wide-field-of-view polarization interference imaging spectrometer, Optics Communications, v. 273, p. 67-73, 2007.
International Search Report and Written Opinion of the International Searching Authority in application PCT/US2010/038238 which corresponds to U.S. Appl. No. 12/482,686.

* cited by examiner

*Primary Examiner* — Dawayne A Pinkney
(74) *Attorney, Agent, or Firm* — NUPAT, LLC; Morrison Ulman

(57) ABSTRACT

A display system is based on a linear array phase modulator and a phase edge discriminator optical system.

37 Claims, 22 Drawing Sheets

A $$F[f(x)*g(x)] = F[f(x)] \cdot F[g(x)]$$

convolution in object plane    multiplication in Fourier plane

B

|  | object plane | Fourier plane |
|---|---|---|
| polarized | Savart plate + polarizers | Wollaston prism + polarizers |
| unpolarized | thick hologram | apodizing filter |

DISPLAY SYSTEM

TECHNICAL FIELD

The disclosure is generally related to the fields of optical display systems and optical micro-electromechanical systems (MEMS) devices.

BACKGROUND

Projection high-definition television (HDTV), high-resolution printing, and maskless semiconductor lithography are a few examples of applications of high-resolution optical display technology. In each case a one- or two-dimensional array of optical modulators and a companion optical system distribute light into millions of pixels that form an image. Some common types of optical modulators are digital mirror devices, grating light modulators, polarization light modulators, liquid crystals and liquid crystal on silicon panels. Depending on their design, these optical modulators may operate in reflective or transmissive modes.

MEMS ribbon structures are used in several types of optical modulators and, despite their simplicity, have spawned dozens of new designs for optical image forming systems. The evolution of optical ideas has led to systems that depend on fewer and fewer ribbons to create each pixel in the final image. Early grating light modulators used as many as six ribbons per pixel, for example, while polarization light modulators have been demonstrated with two ribbons per pixel.

MEMS ribbon structures most often appear in linear-array light modulators. Linear arrays "paint" two-dimensional images when their line-image output is swept back and forth by a scanner. Linear arrays take up far less chip real estate than two-dimensional arrays and are more closely matched to the étendue of laser light sources. If linear arrays could be made shorter by reducing the number of ribbons required to form a pixel, even more compact MEMS light modulator chips could be made.

BRIEF DESCRIPTION OF THE DRAWINGS

FIGS. 10A and 10B illustrate relationships between exemplary object-plane and Fourier-plane discriminators for polarized and unpolarized light.

DETAILED DESCRIPTION

Figure 1:
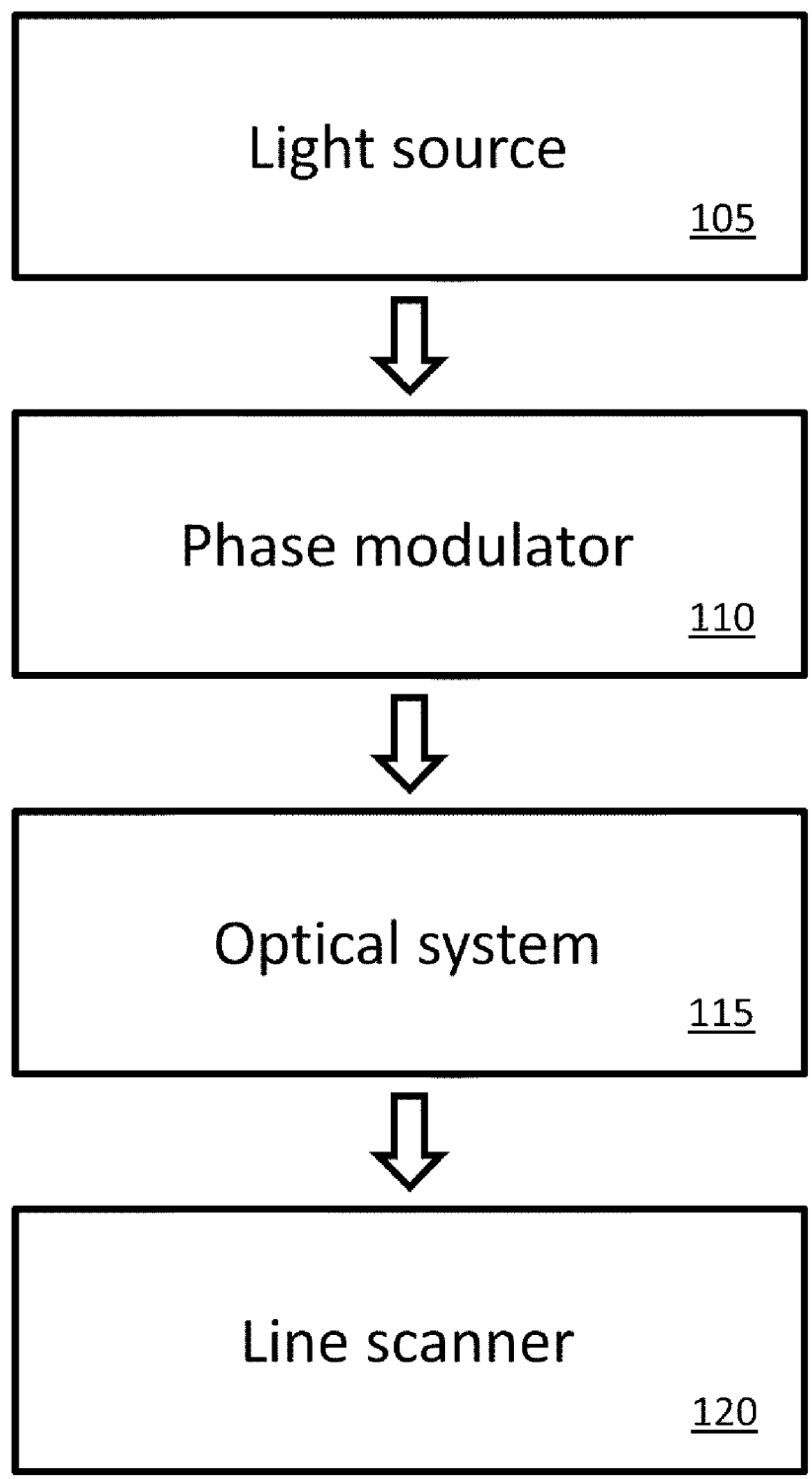
FIG. 1 shows a block diagram of a display system.

FIG. 1 shows a block diagram of a display system. The system includes light source 105, phase modulator 110, optical system 115, and line scanner 120. Light source 105 is a laser, light emitting diode, arc lamp or other bright light source. Phase modulator 110 includes a linear array of elements that change the phase of light; the elements may operate in transmission or reflection. Optical system 115 creates pixels corresponding to phase steps created by the phase modulator. The optical system can be configured such that these phase steps correspond to either bright or dark pixels. By definition, phase repeats every $2\pi$; therefore the maximum phase step is $\pi$. Further, digital (one bright level and one dark level) or analog (many gray levels) operation is possible. Line scanner 120 "paints" two-dimensional images by scanning a line image back and forth.

The optical system acts as a phase edge discriminator. If the linear array of phase elements is set such that it presents a single phase edge—either a step increase or step decrease in phase—then a single-pixel line image is created. A linear array having n elements can be programmed with n edges corresponding to n pixels. (The number of elements could be n±1 depending on how elements at the end of an array are counted, but we still refer to the number of elements and pixels as being "the same".) In the case of a ribbon modulator, only one ribbon per pixel is needed. Furthermore, it is shown below that advanced techniques make possible twice as many pixels as ribbons; i.e. "half" a ribbon per pixel.

The display system is now described in detail. First modulator and display basics are presented, followed by details of coding schemes to translate image data into phase settings for modulator elements. Then a novel optical discriminator system is described. Finally, advanced techniques, extensions to two-dimensional modulators, and experimental results are discussed.

Modulator and Display Basics

Figure 2:
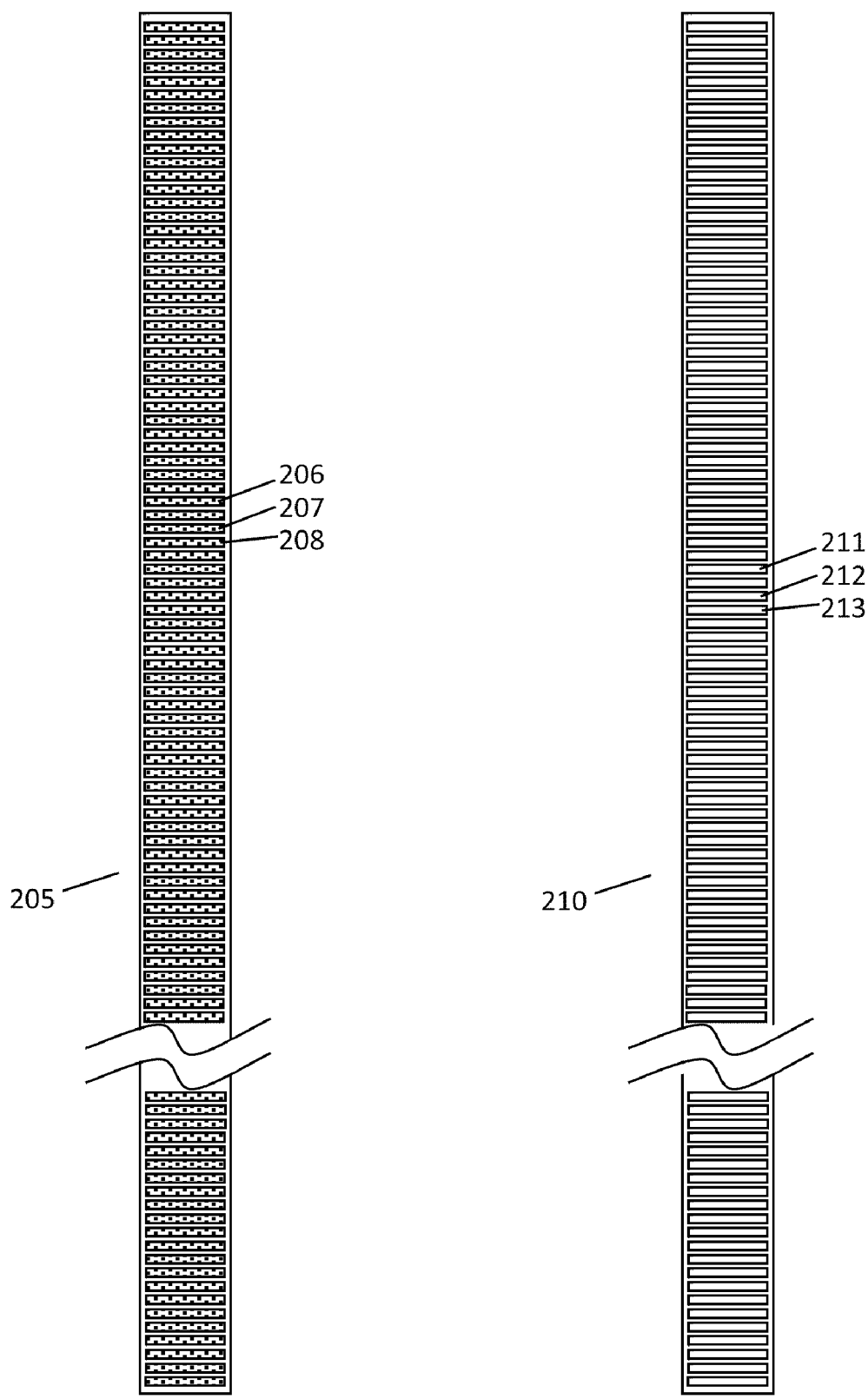
FIG. 2 shows examples of reflective and transmissive linear array phase modulators.

FIG. 2 shows examples of reflective and transmissive linear array phase modulators. Phase modulator 205 contains a large number of individual reflective elements such as elements 206, 207 and 208. Although only a few dozen elements are shown in the figure, an actual modulator may contain hundreds or thousands of elements. In HDTV applications, for example, the number of elements is often between 1,000 and 5,000. Each element in modulator 205 reflects light. A difference in the phase of light reflected by adjacent modulator elements may be achieved by setting the elements to different heights; i.e. moving them perpendicular to the plane of the figure. Reflective elements do not have to be moveable, however; they can be realized as liquid-crystal-on-silicon elements, for example. The elements in modulator 205 are drawn as rectangles; however, they may be square or have other shapes.

Phase modulator 210 is very similar to phase modulator 205 except that the individual elements of the modulator, such as elements 211, 212 and 213, are transmissive. These transmissive elements impart a variable phase to light passing through them. The transmissive elements are not necessarily movable; they may be realized as liquid crystals, for example. Other aspects of phase modulator 210, such as the number and shape of the elements are the same as in the case of phase modulator 205.

Figure 3:
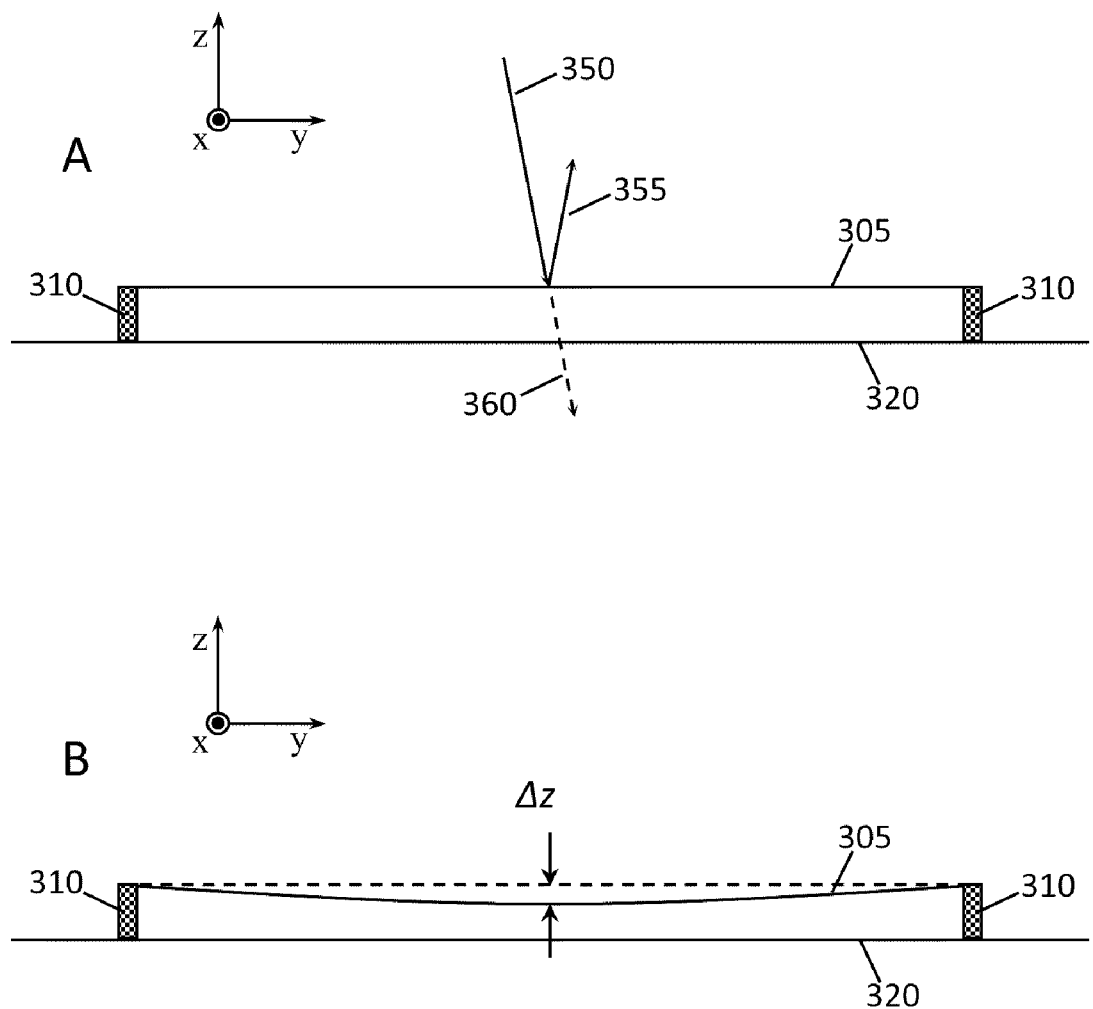
FIGS. 3A and 3B show a micromechanical ribbon.

FIGS. 3A and 3B show a micromechanical ribbon which is an example of a MEMS structure that may be used to make elements in a reflective phase modulator such as modulator 205. FIG. 3A shows a ribbon in an undeflected state while FIG. 3B shows a ribbon deflected by a distance Δz.

In FIGS. 3A and 3B MEMS ribbon 305 is supported by supports 310 near a substrate 320. In typical applications the dimensions of ribbon are approximately 100 μm long (i.e. in the y direction), 10 μm wide (i.e. in the x direction) and 0.1 μm thick (i.e. in the z direction). These dimensions may vary greatly in different designs however. It would not be unusual for any of the measurements just mentioned to be five times greater or smaller, for example.

FIG. 3A shows light beam 350 reflecting off ribbon 305 and returning as light beam 355. If light beam 350 reflects off a ribbon deflected by a distance Δz (as shown in FIG. 3B), then the phase of reflected beam 355 is changed by $$2\left(\frac{2\pi}{\lambda}\right)\Delta z$$

where λ is the wavelength of the light. If adjacent ribbons in an array are deflected by distances $\Delta z_1$ and $\Delta z_2$, then the phase difference between light reflected off the adjacent ribbons is $$2\left(\frac{2\pi}{\lambda}\right)(\Delta z_1 - \Delta z_2).$$

Deflections of ribbon 305 in the z direction may be achieved by applying a voltage between the ribbon and substrate 320. Depending on the size of the ribbon, its height may be adjusted in as little as a few nanoseconds.

Dotted arrow 360 indicates the path that light beam 350 would follow if ribbon 305 were transmissive rather than reflective. It is often useful to draw optical systems unfolded at reflective surfaces; i.e. it can be useful to draw light beams as if they were transmitted by reflective surfaces.

Figure 4:
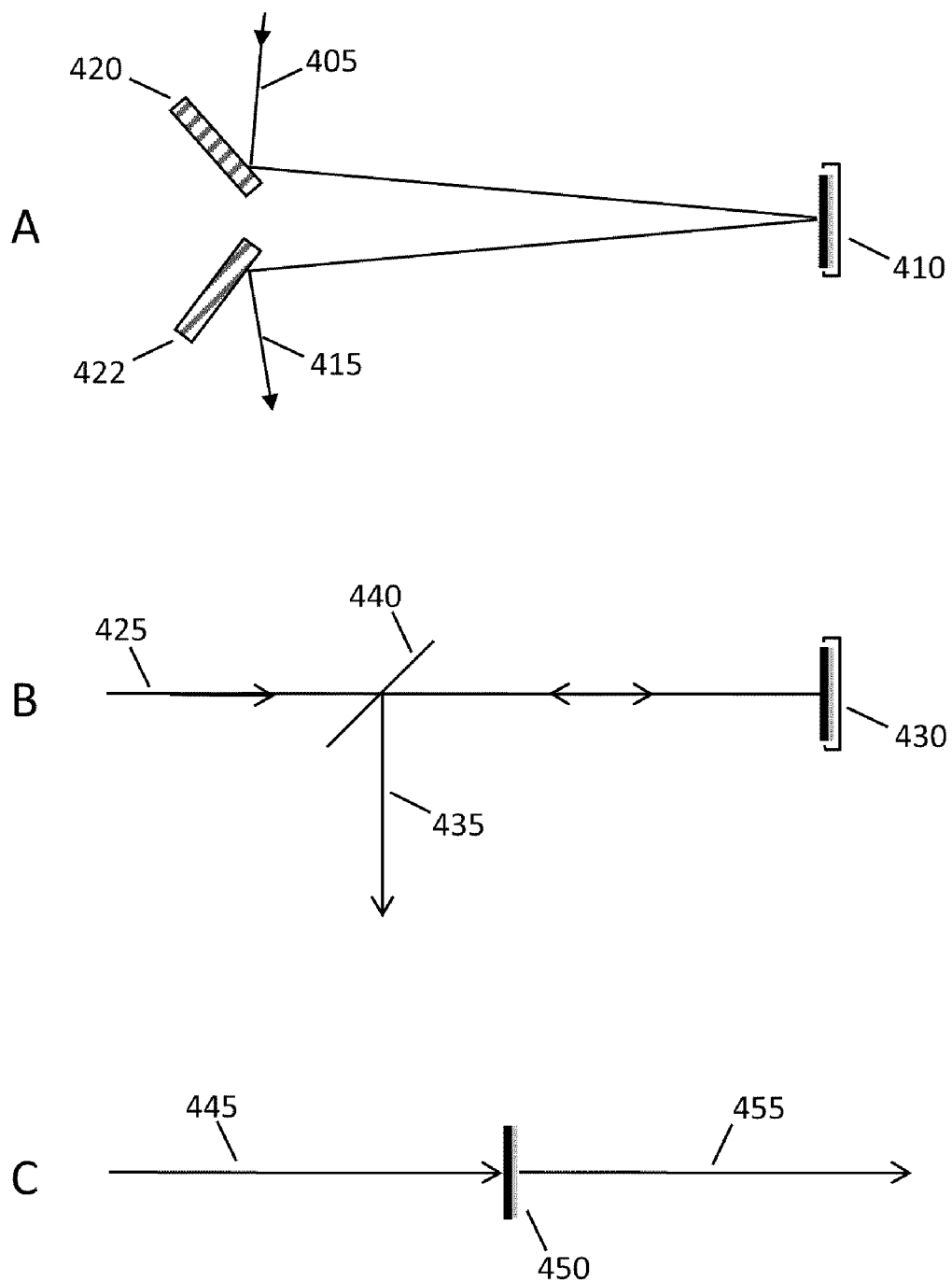
FIGS. 4A, 4B and 4C show optical arrangements with reflective and transmissive modulators.

FIGS. 4A, 4B and 4C show optical arrangements with reflective and transmissive modulators. In FIG. 4A input light beam 405 is modulated by reflective phase modulator 410 to form output light beam 415. Steering mirrors 420 and 422 direct light beams to and from the modulator at nearly, but not exactly, normal incidence to the modulator. In FIG. 4B input light beam 425 is modulated by reflective modulator 430 to form output light beam 435. Output beam 435 is separated from input beam 425 by beam splitter 440. The arrangement shown in FIG. 4B allows the modulator to be illuminated at normal incidence. In FIG. 4C input light beam 445 is modulated by transmission modulator 450 to form output beam 455.

Figure 5:
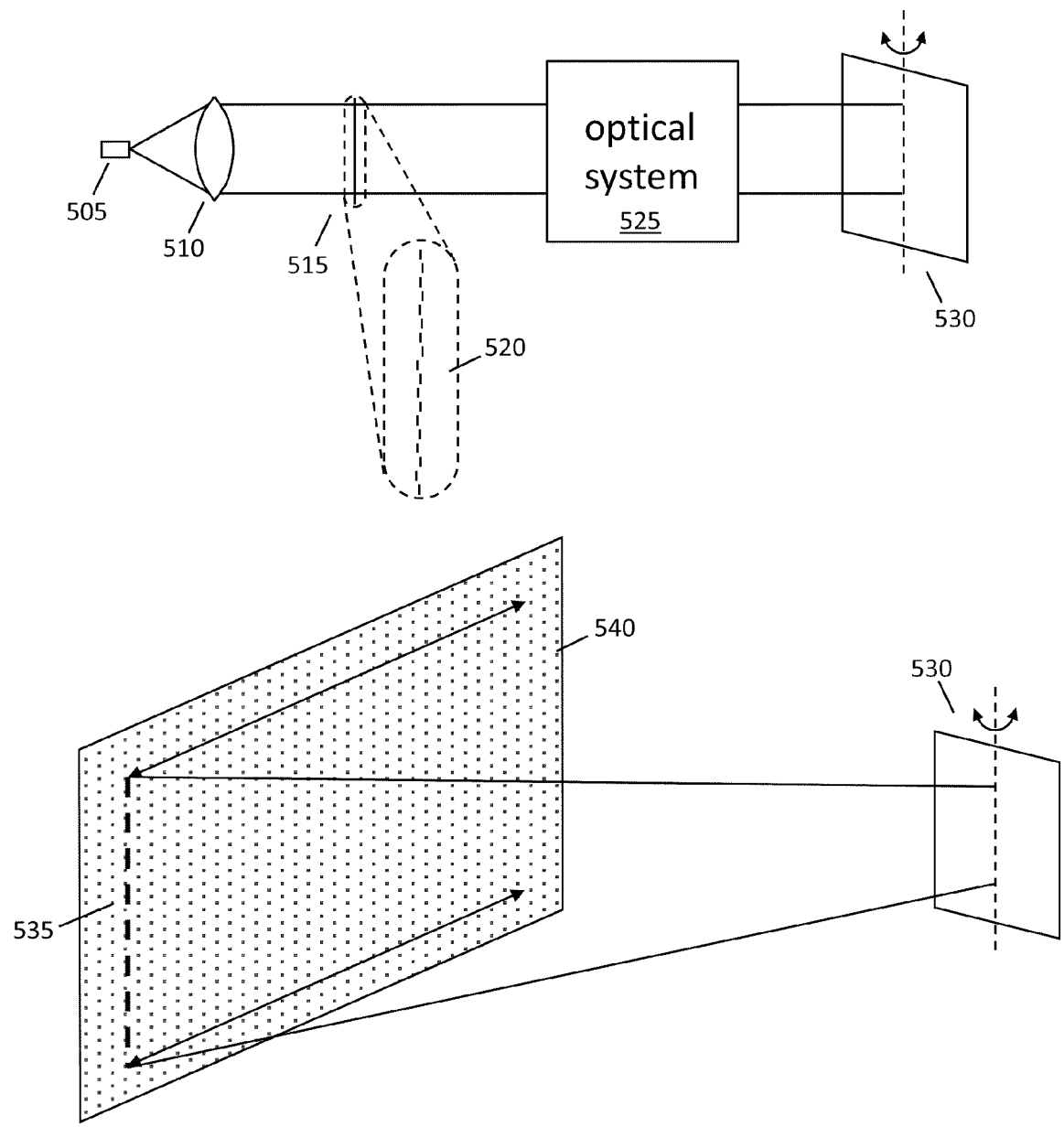
FIG. 5 shows a display system based on a linear array phase modulator.

FIG. 5 shows a display system based on a linear array phase modulator. In FIG. 5, light source 505 emits light that passes through lens 510 before being reflected or transmitted by linear array phase modulator 515. Phase modulator 515 may be a reflective or transmissive modulator; in the figure it is drawn as if it were transmissive and slight offsets in the linear array of elements shown schematically in inset 520 indicate phase differences imparted to the transmitted light. Optical system 525 converts the phase differences into a line image that is reflected by scanner 530. Finally scanner 530 sweeps line image 535 across a surface 540 for viewing or printing. As examples, in a projection display, surface 540 could be a viewing screen while in a lithography system surface 540 could be a wafer coated with photoresist. In lithography and other printing applications an alternative to the scanning mirror is to move the surface rather than scanning the line image. In some systems a rotating prism may replace the scanning mirror.

Thus, a display system includes a light source, phase modulator, optical system and line scanner. The phase modulator contains a linear array of transmissive or reflective elements such as MEMS ribbons or liquid crystal modulators and the elements may be illuminated at normal incidence or off-axis. An optical system converts phase differences created by adjacent modulator elements into brightness variations among pixels in a line image. The line image may be scanned to form a two-dimensional image.

Coding Schemes

Image data, meaning the brightness of individual pixels in an image, is sent to a display system for display. Coding schemes are used to translate the image data into phase settings for modulator elements in a linear array phase modulator. The coding schemes described here are analogous to non-return-to-zero, inverted (NRZI) coding used in digital signal transmission. NRZI is a method of mapping a binary signal to a two-level physical signal. An NRZI signal has a transition at a clock boundary if the bit being transmitted is a logical one, and does not have a transition if the bit being transmitted is a logical zero. (NRZI can also take the opposite convention in which a logical zero is encoded by a transition and a logical one is encoded by a steady level.)

Figure 6:
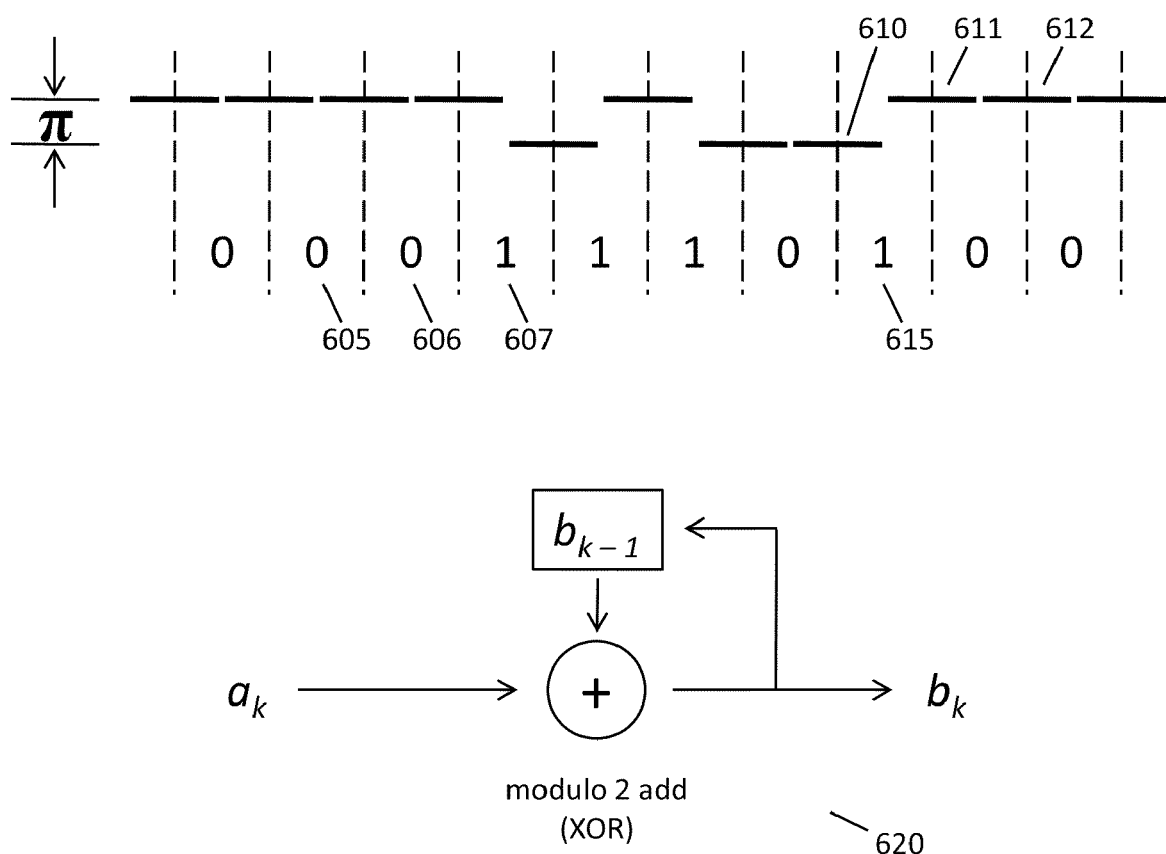
FIG. 6 shows an example of a coding scheme for a digital phase modulator.

FIG. 6 shows an example of a coding scheme for a digital phase modulator. A digital phase modulator creates dark or bright pixels from phase differences of 0 or π between adjacent modulator elements. Gray scale, if desired, may be achieved via time domain techniques such as pulse width modulation In FIG. 6 data is shown as bits such as bits 605, 606 and 607 while the phase of modulator elements is represented by line segments such as 610, 611 and 612. The line segments appear in either of two positions representing a phase difference of π between them. Consider bit 615, a "1" indicating a bright pixel. This bit is coded as a π phase shift between modulator elements 610 and 611. It makes no difference which of elements 610 and 611 is "up" or "down"; only the difference in their phases matters. Notice for example that bit 607 is also a "1" yet it is represented by elements in the opposite configuration from 610 and 611. "0" bits are represented by adjacent elements in the same configuration.

Logic diagram 620 shows one way to formally specify the phase of the next element in a linear array phase modulator. Suppose for example that a string of dark bits ("0") has been encoded by a string of phase modulator elements all having the same phase. How should a subsequent bright bit ("1") be represented? Diagram 620 shows that the phase "$b_k$" of the next modulator element is determined from the value of the bit "$a_k$" ("1" in this example) and the phase of the previous element ("$b_{k-1}$" where phase is normalized such that π=1). This is equivalent to saying "create a phase edge for a bright pixel, keep the phase constant for a dark pixel". That is why the line segments in the figure straddle the dotted line boundaries between bits.

Figure 7:
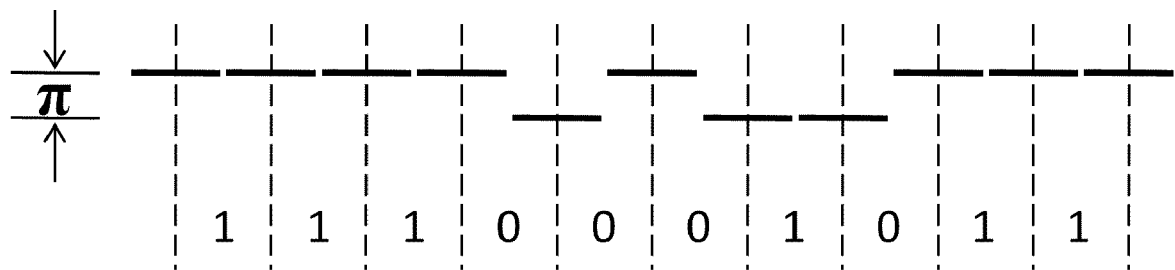
FIG. 7 shows a second example of a coding scheme for a digital phase modulator.
Figure 7:
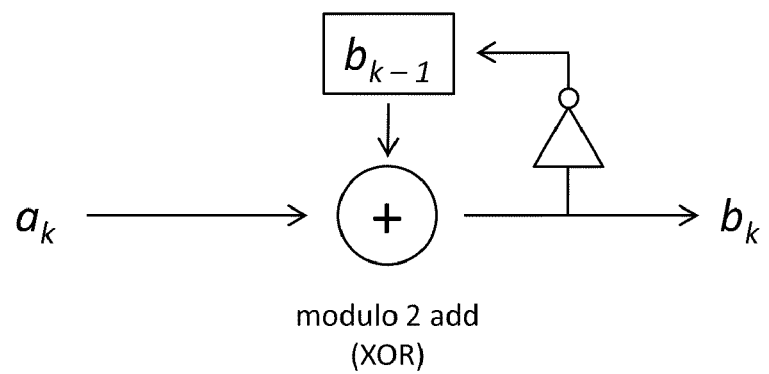

FIG. 7 shows a second example of a coding scheme for a digital phase modulator. This example is the same as that shown in FIG. 6 except that the coding rule has changed to "flip the phase for a dark pixel, keep it the same for a bright pixel". The choice of whether to use the coding scheme of FIG. 6 or FIG. 7 in a digital modulator depends on the optical discriminator system which translates phase differences into bright or dark pixels.

Figure 8:
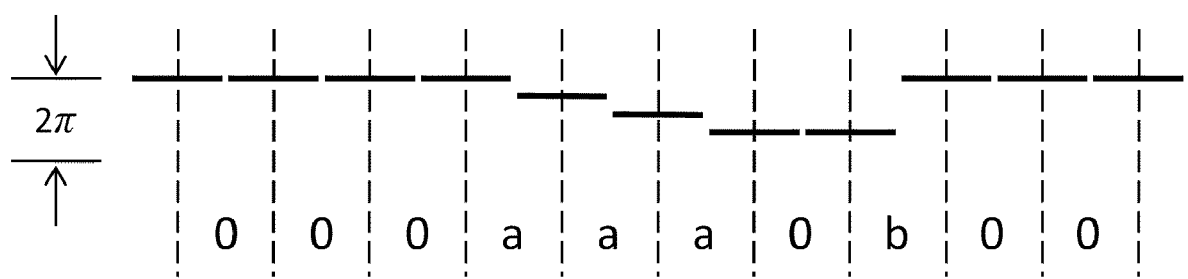
FIG. 8 shows an example of coding for an analog phase modulator.

FIG. 8 shows an example of coding for an analog phase modulator. As in FIGS. 6 and 7, positions of line segments represent the phase of modulator elements. However in analog coding the elements are adjustable through a range of $2\pi$. In this example, greater phase differences correspond to greater pixel brightness. "0", meaning dark, pixels are represented by 0 phase differences between adjacent pixels. Brightness "a" is represented by a small phase difference while brightness "b" is represented by a greater phase difference.

Figure 9:
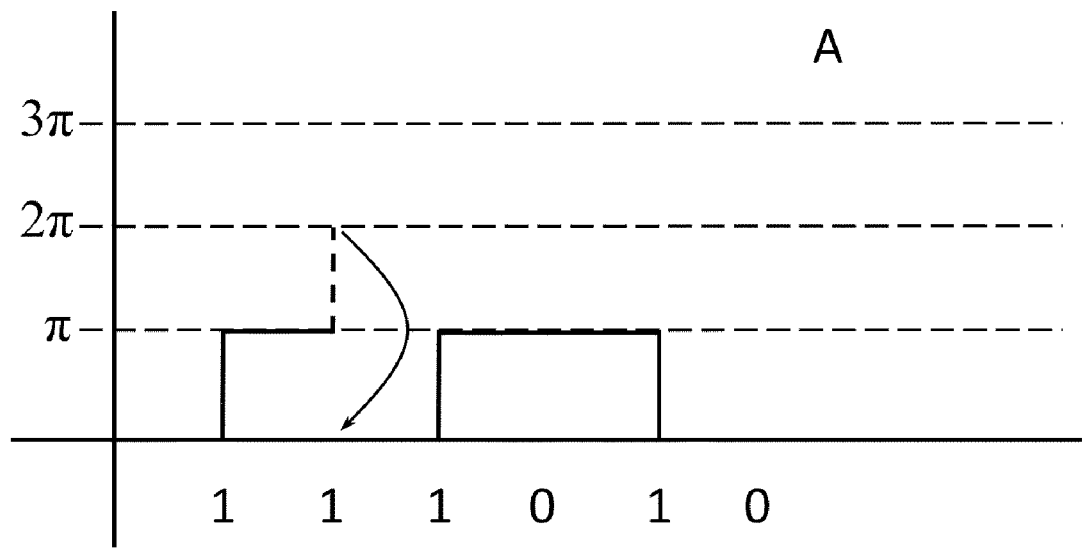
FIG. 9A and 9B are graphs that aid understanding of digital and analog phase modulation schemes.
Figure 9:
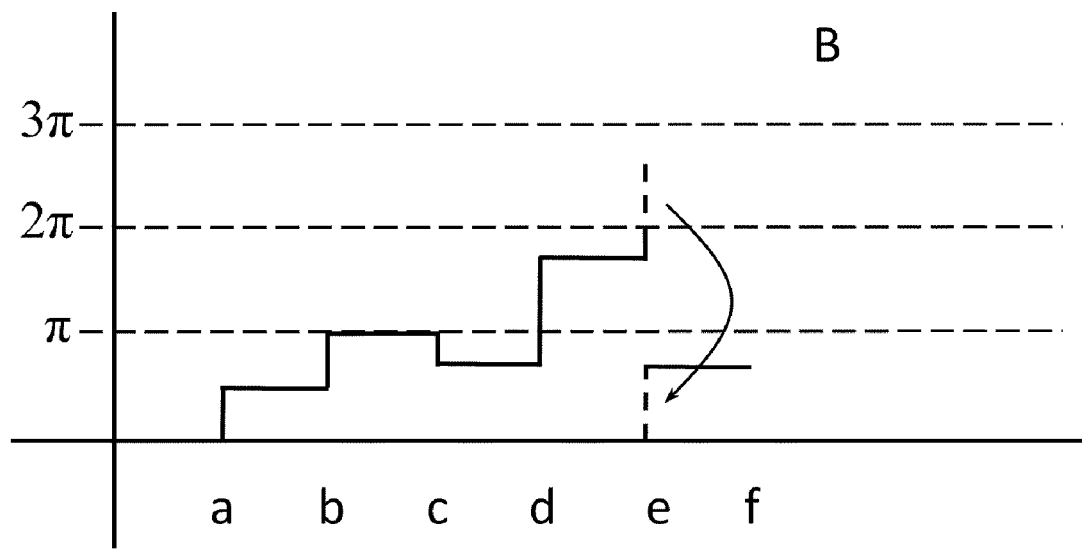

FIG. 9A and 9B are graphs that aid understanding of digital and analog phase modulation schemes. FIG. 9A pertains to digital modulation described in connection with FIGS. 6 and 7 while FIG. 9B pertains to analog modulation described in connection with FIG. 8. In FIG. 9A a sequence of digital bits ("1 1 1 0 1 0") is shown along the horizontal axis while the phase of modulator elements is shown along the vertical axis. Bits appear at boundaries between modulator elements and the case illustrated is the one in which "1" is represented by a phase difference while "0" is represented by no change in phase. Therefore vertical lines appear in the graph whenever a "1" is desired as the displayed output.

At the first "1" bit (counting from the left) a $\pi$ phase difference between the first and second modulator elements is shown by a vertical line. At the second "1" bit a dotted line and curved arrow indicate that the desired phase difference of $\pi$ between the second and third modulator elements may be achieved either by creating a phase difference of $2\pi$ between the first and third modulator elements or by a zero phase difference between those elements. Since 0 and $2\pi$ phase shifts are the same, elements in a reflective digital phase modulator need not move more than $\lambda/4$ where $\lambda$ is the wavelength of light.

In FIG. 9B a sequence of analog pixel brightnesses ("a b c d e f") is shown along the horizontal axis while the phase of modulator elements is shown along the vertical axis. Pixels are created from phase differences at boundaries between modulator elements; greater phase differences correspond to greater pixel brightness in this example, but the opposite could be true depending on the optical discriminator system used. Vertical lines appear in the graph whenever a (non-dark) pixel is desired as the displayed output.

Starting from the left, the phase of each element increases for pixels "a" and "b"; however, pixel "c" is created by the phase decrease between the third and fourth modulator elements. Pixel "c" would be equally bright if phase difference between the third and fourth modulator elements had been obtained from an increase in phase. The brightness of pixel "c" depends on the magnitude of the phase difference, not its sign.

Pixel "e" is created by a phase increase from the fifth to the sixth modulator elements. However phase repeats every $2\pi$ by definition. The dotted line and curved arrow indicate how the phase of the sixth modulator element can be set to represent the desired phase increase modulo $2\pi$. An alternative would be to set the phase of the sixth element to represent a phase decrease from the fifth element. The pixel brightness is the same even though the absolute phase of the sixth element is different in the two cases.

FIG. 9B suggests that several coding strategies are possible for an analog phase modulator. One strategy is to always alternate the sign of the phase difference between modulator elements; i.e. if the transition between the previous two elements was a phase increase, the transition between the next two is a phase decrease. This strategy tends to direct light to high angles in an optical system. Another strategy is to always keep the sign of the phase difference between modulator elements the same; i.e. always increasing or always decreasing. Of course, phase "wraps around" at $2\pi$. This strategy tends to direct light near the axis of an optical system. A third strategy is to randomly choose the sign of the phase difference between modulator elements.

Four broad schemes for translating image data into phase settings for modulator elements have been described: digital and analog, and bright pixels corresponding to either greater or smaller phase edges in each case.

Optical Discriminator

An optical system converts phase edges created by the modulator into a line image that may be scanned to form a two-dimensional image for viewing. This system functions as an optical phase discriminator that may take many forms because of duality between operations performed in the object plane and the Fourier plane of an optical system.

FIGS. 10A and 10B illustrate relationships between exemplary object-plane and Fourier-plane discriminators for polarized and unpolarized light. FIG. 10A shows that convolution in the object plane of an optical system is equivalent to multiplication in the Fourier plane of the system. This relationship can be used as a guide to create different phase discriminator systems. FIG. 10B shows that at least four different optical systems can be constructed using the relationship of FIG. 10A.

For a system using polarized light, a discriminator may be based on a Savart plate and polarizers in the object plane or on a Wollaston prism and polarizers in the Fourier plane. For a system using unpolarized light, a discriminator may be based on a thick hologram in the object plane or on an apodizing filter in the Fourier plane. Details of these optical arrangements are described below; however, there are no doubt other optical schemes that follow from the relationship illustrated in FIG. 10A.

Figure 11:
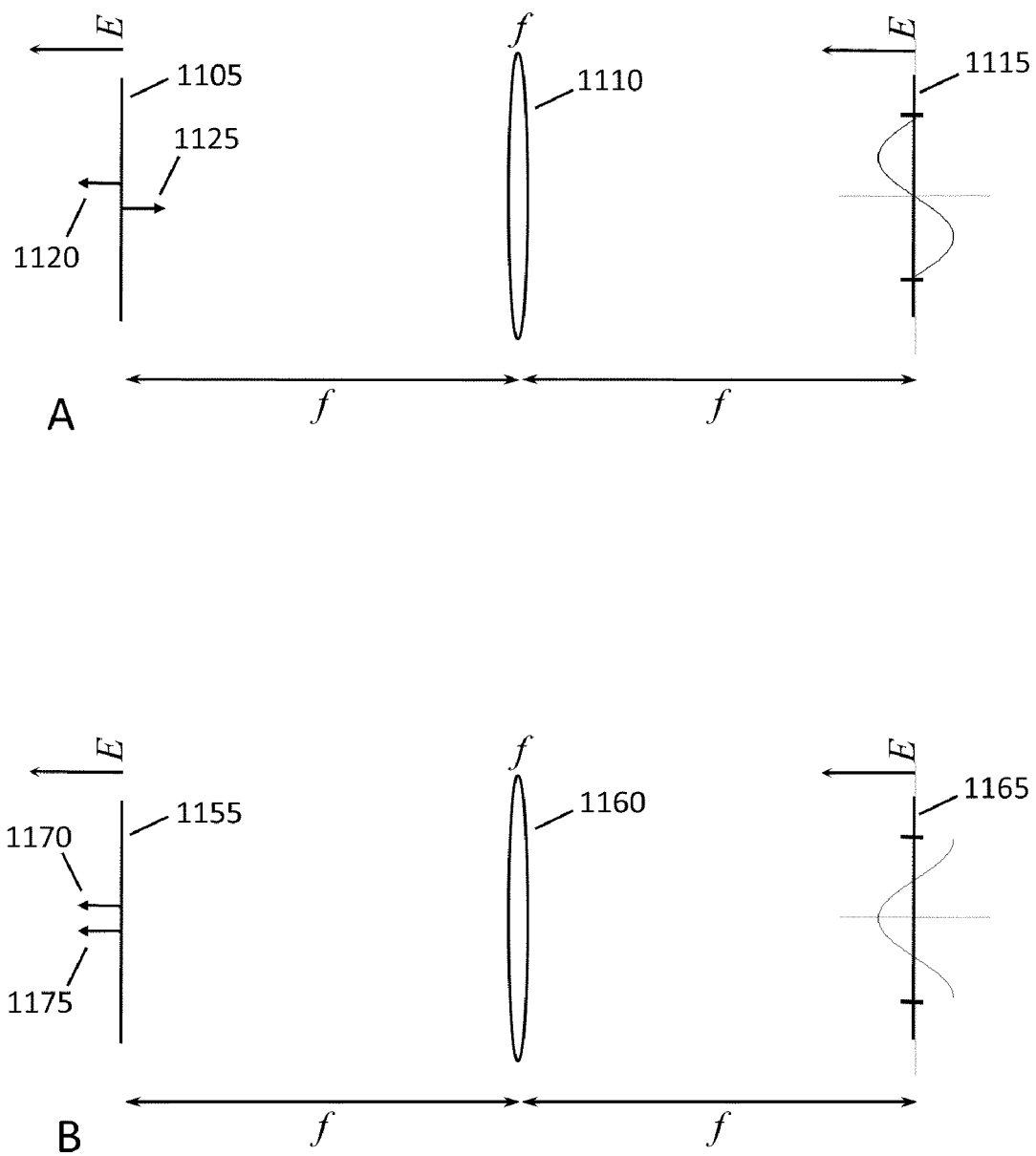
FIGS. 11A and 11B show optical systems and Fourier-plane filter response functions.

FIGS. 11A and 11B show optical systems and Fourier-plane filter response functions. In FIG. 11A line 1105 represents the object plane of the system while line 1115 represents the Fourier plane. The object and Fourier planes exist on opposite sides of, and one focal length away from, lens 1110. Arrows 1120 and 1125 represent positive and negative delta functions respectively that are spaced apart by a small distance.

Convolution of close-spaced negative and positive delta functions with a linear array of light modulator elements is equivalent to sampling the differences between phases of light coming from adjacent elements when the spacing between the delta functions less than or equal to the spacing between element centers. Therefore FIG. 11A shows a system in which greater phase differences between adjacent elements in a phase modulator correspond to greater pixel brightness.

In FIG. 11B line 1155 represents the object plane of the system while line 1165 represents the Fourier plane. The object and Fourier planes exist on opposite sides of, and one focal length away from, lens 1160. Arrows 1170 and 1175 represent two positive delta functions that are spaced apart by a small distance.

Convolution of close-spaced positive delta functions with a linear array of light modulator elements is equivalent to sampling the similarities between phases of light coming from adjacent elements when the spacing between the delta functions less than or equal to the spacing between element centers. Therefore FIG. 11B shows a system in which smaller phase differences between adjacent elements in a phase modulator correspond to greater pixel brightness.

According to FIG. 10A convolution in the object plane corresponds to multiplication in the Fourier plane. Therefore convolution with close-spaced positive and negative delta functions in the object plane corresponds to multiplication by a sine function in the Fourier plane as shown in FIG. 11A. Convolution with close-spaced positive delta functions in the object plane corresponds to multiplication by a cosine function in the Fourier plane as shown in FIG. 11B.

Considering further the "sine" case shown in FIG. 11A, as delta functions 1120 and 1125 are brought closer together, sampling the differences between adjacent segments in the object plane looks more like differentiation and the sine function in the Fourier plane begins to approximate a line. Said another way differentiation in the object plane is equivalent to multiplication by a linear slope in the Fourier plane.

The sine response in the Fourier plane is truncated in an optical system of finite lateral extent as drawn in FIG. 11A. The corresponding effect in the object plane is that delta functions 1120 and 1125 are broadened into sine functions. Finally, optical efficiency is greatest when the spacing between delta functions (or sine functions) in the object plane matches the spacing between phase modulator elements. In the case of FIG. 11A pixel brightness is proportional to $\sin^2((\phi/2))$ where $\phi$ is the phase difference between adjacent phase modulator elements. In the case of FIG. 11B brightness is proportional to $\cos^2((\phi/2))$.

FIGS. 12A and 12B show exemplary optical systems for polarized light. The system of FIG. 12A uses Fourier plane optical elements while the system of FIG. 12B uses object plane optical elements. Either system may be configured to exhibit the sine response of FIG. 11A or the cosine response of FIG. 11B.

In FIG. 12A, line segments 1205 represent elements of a linear array optical phase modulator. Lens 1210 is placed one focal length away from, and between, the phase modulator elements and a Wollaston prism 1215. The Wollaston prism is sandwiched by polarizers 1230 and 1235. In FIG. 12A polarizers 1230 and 1235 are illustrated with crossed polarization axes. This configuration yields the sine response of FIG. 11A. If the polarizers were oriented with parallel polarization axes, the cosine response of FIG. 11B would be obtained.

In FIG. 12B, line segments 1255 represent elements of a linear array optical phase modulator. Lens 1260 is placed one focal length away from, and between, the phase modulator elements and Fourier plane 1265. Savart plate 1270 is placed between lens 1260 and phase modulator elements 1255. The Savart plate is sandwiched by polarizers 1280 and 1285. In FIG. 12B polarizers 1280 and 1285 are illustrated with crossed polarization axes. This configuration yields the sine response of FIG. 11A. If the polarizers were oriented with parallel polarization axes, the cosine response of FIG. 11B would be obtained.

The system of FIG. 12B will now be considered in more detail. FIG. 13 shows a Savart plate 1305. A Savart plate is constructed from two birefringent plates with optical axes oriented 45° to the surface normal and rotated 90° with respect to each other. An incident light beam propagating through the first plate is resolved into ordinary and extraordinary beams which are displaced from each other. Upon entering the second plate, the ordinary beam becomes an extraordinary beam, and vice-versa. Two beams emerge from the Savart plate displaced along a diagonal by a distance, "d". The optical path difference between the two beams is zero for normal incidence.

Figure 14:
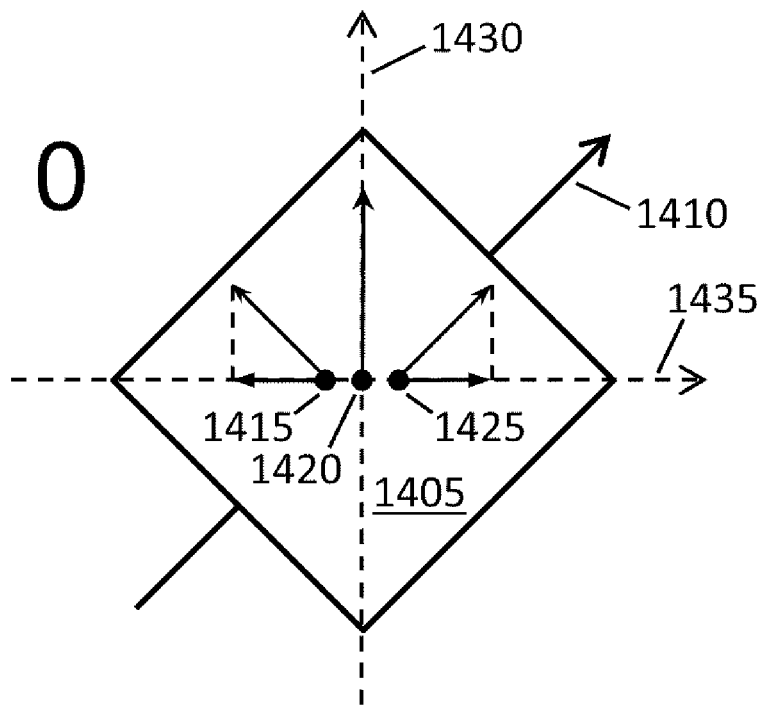
FIG. 14 illustrates polarization relationships in a Savart plate phase discriminator.
Figure 14:
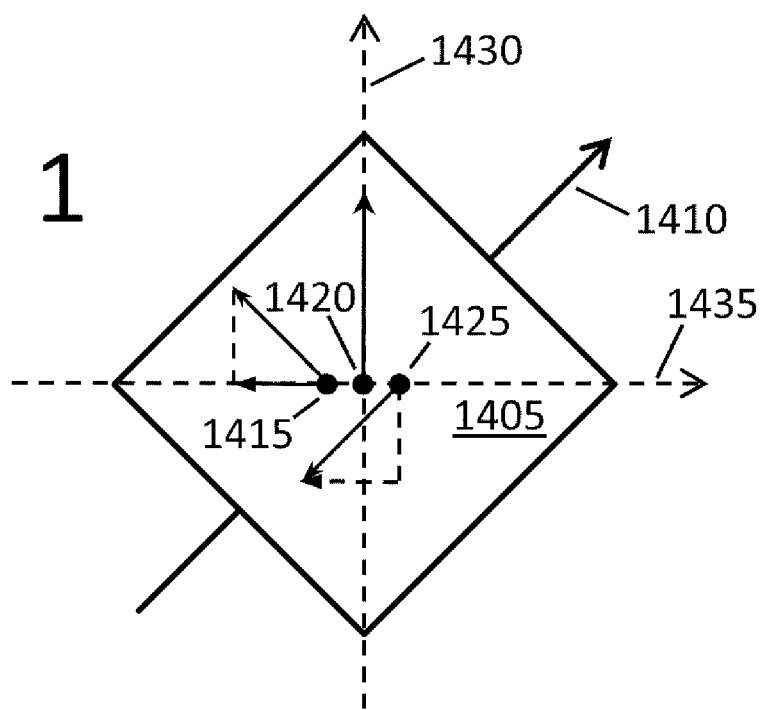

FIG. 14 illustrates polarization relationships in a Savart plate phase discriminator. Two scenarios are shown: "0" and "1". In scenario "0" Savart plate 1405 has optical axis 1410. Axes 1430 and 1435 represent polarization axes of polarizers placed on either side of the Savart plate; i.e. one closer to the viewer than the plate, one farther away. Consider a light beam at the position of dot 1420 and polarized along axis 1430. This light beam is split by the Savart plate into two component beams at the positions of dots 1415 and 1425 having polarizations perpendicular and parallel to optical axis 1410 respectively. When these two beams are analyzed by a polarizer oriented along axis 1435, no light passes. Scenario "0" describes the situation when adjacent elements of a phase modulator are viewed through a Savart plate sandwiched by crossed polarizers and the elements emit light in phase.

In scenario "1" the light at dot 1425 arrives at the Savart plate with a $\pi$ phase shift compared to the light at dot 1415. Now when light with polarization parallel and perpendicular to the optical axis of the Savart plate is analyzed by a polarizer along axis 1435, the components add in phase and maximum light is transmitted. Scenario "1" describes the situation when adjacent elements of a phase modulator are viewed through a Savart plate sandwiched by crossed polarizers and the elements emit light out of phase.

Placing a Savart plate sandwiched by crossed polarizers at the object plane (or between the modulator and the lens) is one way to construct a phase discriminator having an impulse response $$h(x) = \left[\frac{1}{x_0}\mathrm{sinc}\left(\frac{1}{x_0}\left(x - \frac{p}{2}\right)\right) - \frac{1}{x_0}\mathrm{sinc}\left(\frac{1}{x_0}\left(x + \frac{p}{2}\right)\right)\right].$$

Here, p is the distance between positive and negative sine functions analogous to ideal delta functions 1120 and 1125 in FIG. 11A. $x_0$ determines the width (first zero crossing) of the sine functions; delta functions are obtained when $x_0$ goes to zero. (If the polarizers are parallel, rather than crossed, the impulse response becomes $$h(x) = \left[\frac{1}{x_0}\mathrm{sinc}\left(\frac{1}{x_0}\left(x - \frac{p}{2}\right)\right) + \frac{1}{x_0}\mathrm{sinc}\left(\frac{1}{x_0}\left(x + \frac{p}{2}\right)\right)\right].$$

Figure 12:
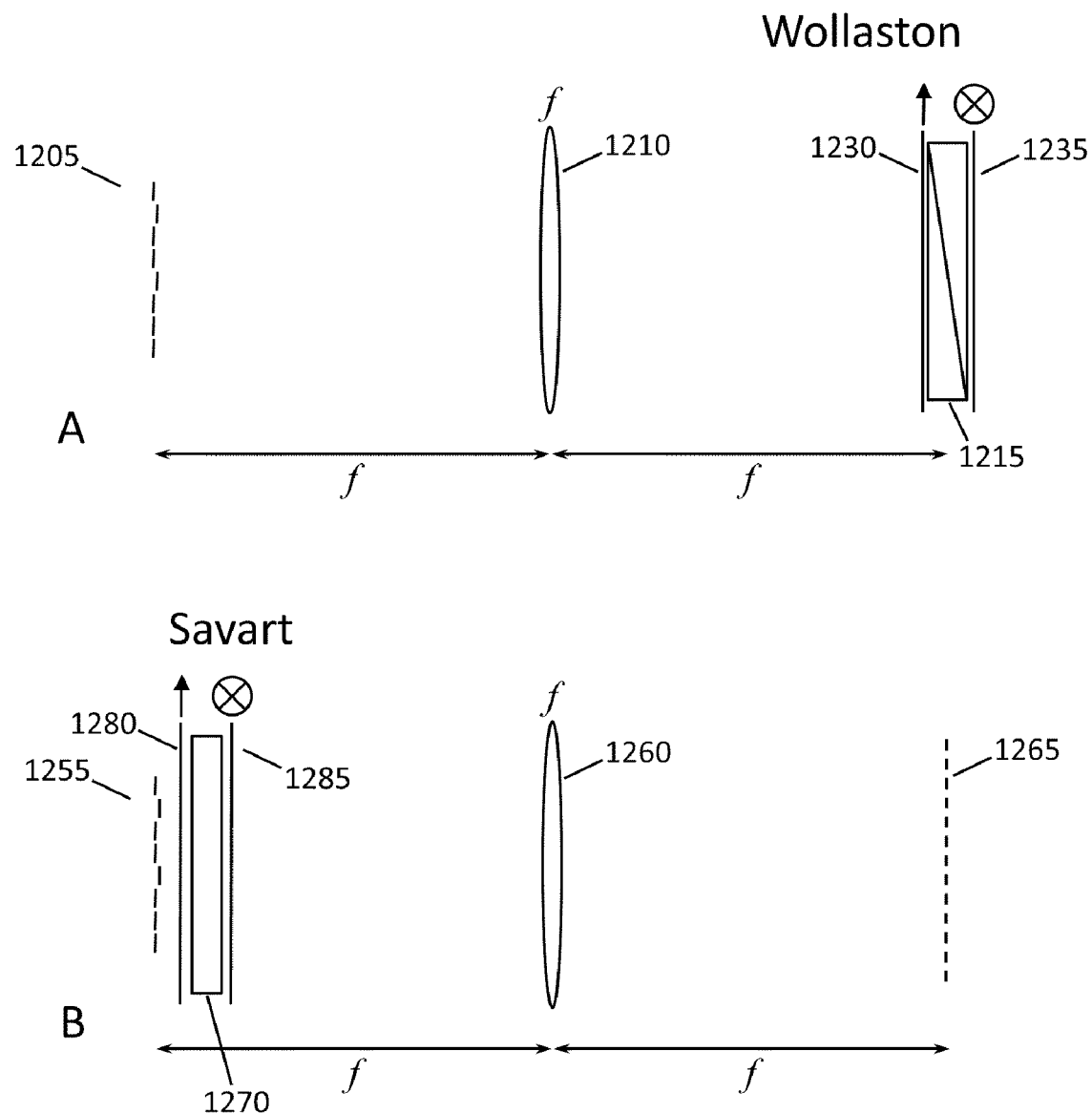
FIGS. 12A and 12B show exemplary optical systems for polarized light.
Figure 13:
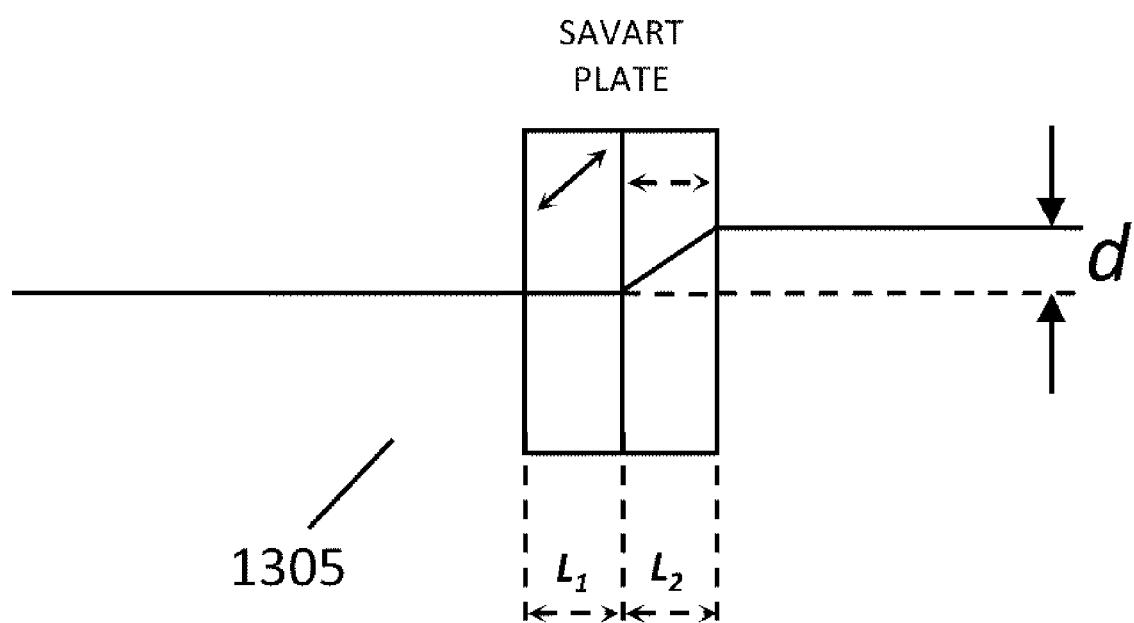
FIG. 13 shows a Savart plate.
Figure 16:
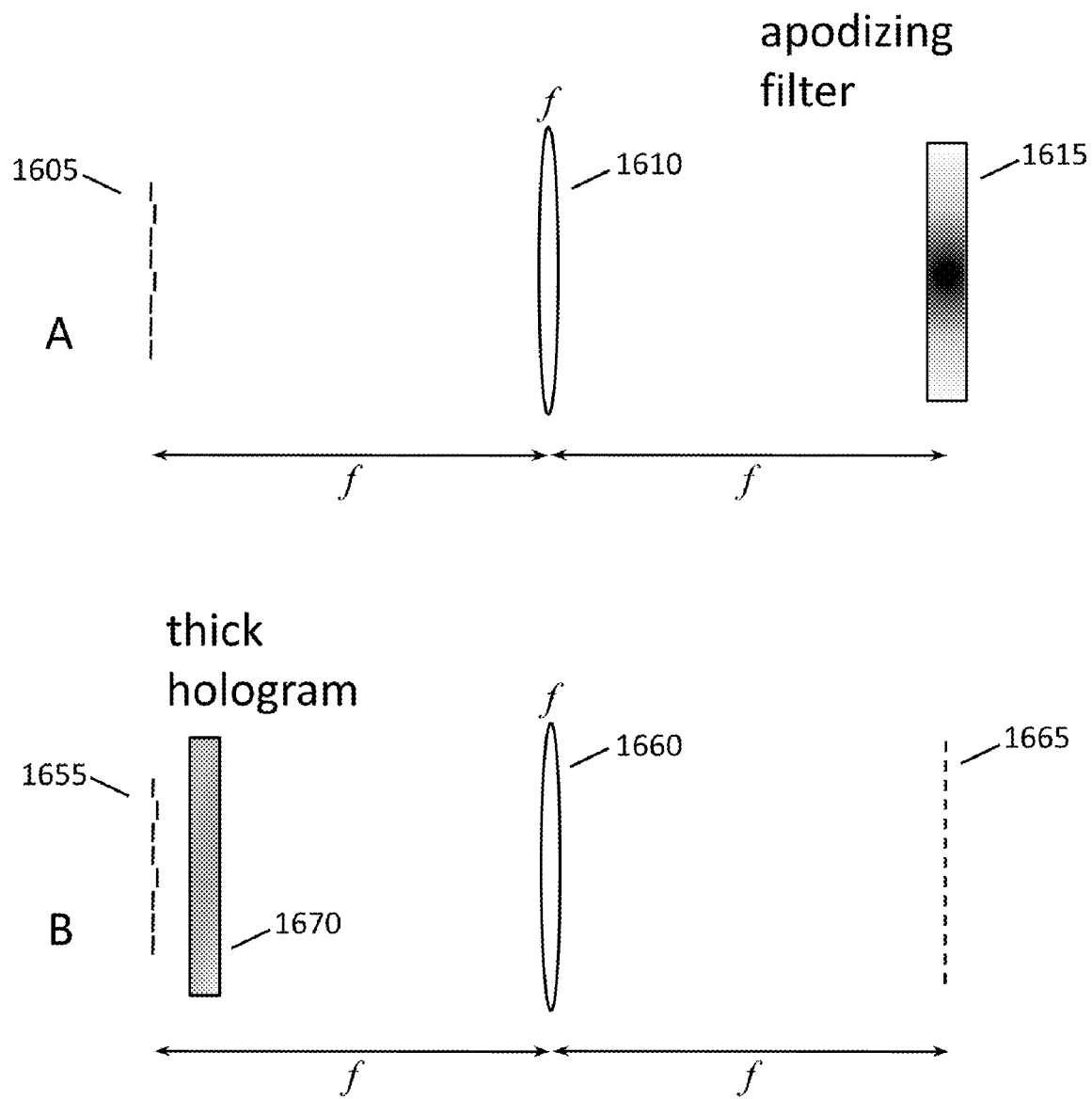
FIGS. 16A and 16B show exemplary optical systems for unpolarized light.

Each of the four discriminators summarized in FIGS. 10B, 12 and 16 can produce either of these impulse response functions.

The Fourier transform, H(k), of h(x) is a sine function that is cut off at $+/-(\lambda/x_0)$. When the sine function is cut off at $+/-(\lambda/p)$, as plotted at plane 1115 in FIG. 11A, pixel intensities in a corresponding line image are proportional to $\sin^2(x-\alpha)$ where '$\alpha$' represents the position of a particular pixel along the length of a linear array. If the sine function were cut off farther away from the optical axis than $+/-(\lambda/p)$, the pixels in a line image would become square rather than have a $\sin^2(x)$ spatial intensity profile.

Figure 15:
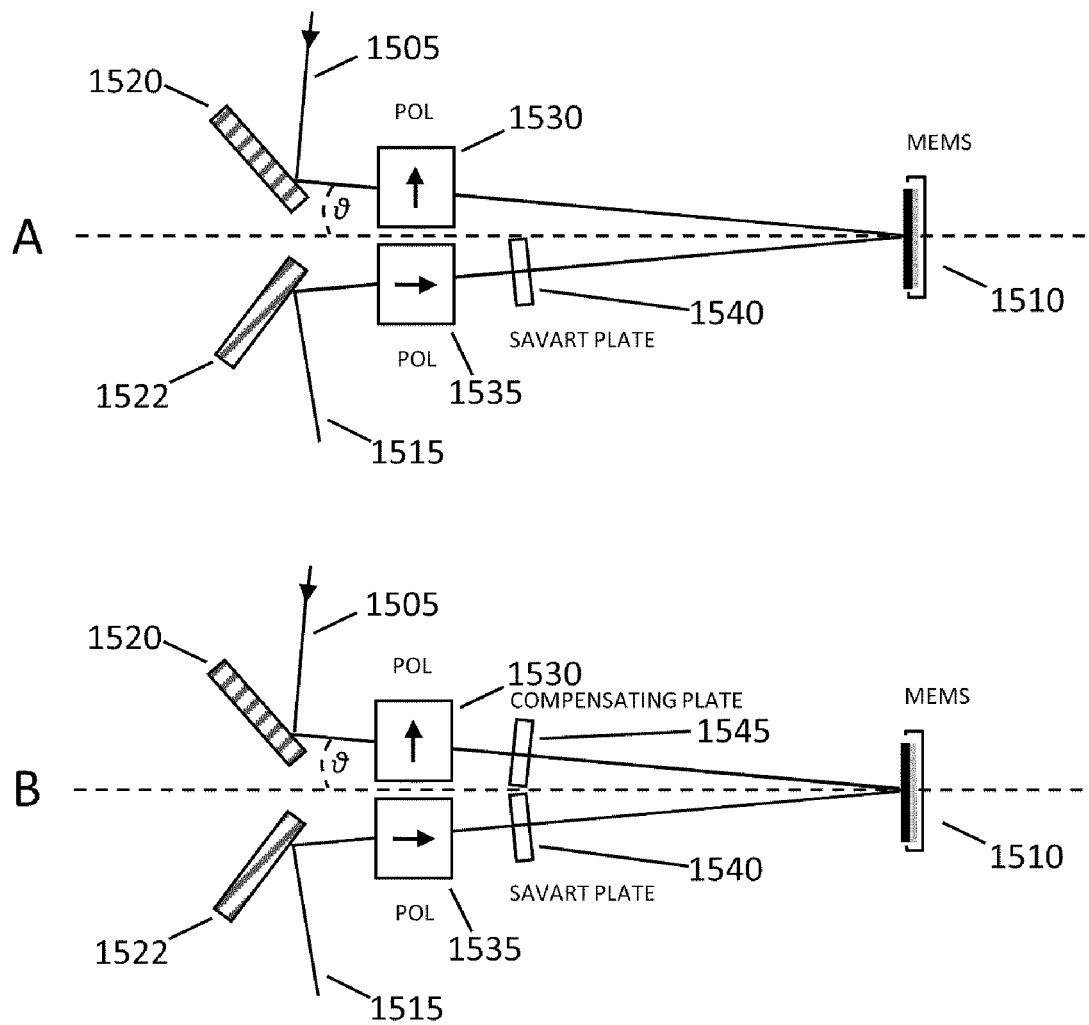
FIGS. 15A and 15B show an exemplary modulator—discriminator arrangement.

FIGS. 15A and 15B show an exemplary modulator-discriminator arrangement. The arrangement of FIG. 15 is the off-axis arrangement of FIG. 4A using the discriminator elements of FIG. 12B with crossed polarizers for sine detection.

A Savart plate is placed between a phase modulator and a lens such as lens 1260 of FIG. 12B (not shown in FIG. 15).

In FIG. 15A input light beam 1505 is modulated by reflective phase modulator 1510 to form output light beam 1515. Steering mirrors 1520 and 1522 direct the light beams to and from the modulator at near normal incidence to the modulator. Polarizers 1530 and 1535 are oriented with their polarization axes perpendicular to one another and at 45° to the optical axis of Savart plate 1540. Polarizer 1530 is not necessary if input light beam 1505 is already polarized as is the case with laser light sources, for example.

FIG. 15B shows the same arrangement as FIG. 15A with the addition of compensating plate 1545. This plate, which may be another Savart plate, is not necessary to achieve any of the optical phase discrimination functions of the optical system described herein. However, the plate may be useful for reducing second order effects that can appear for off-axis light.

FIGS. 16A and 16B show exemplary optical systems for unpolarized light. These are the apodizing filter and thick hologram respectively mentioned in connection with FIG. 10. FIG. 10A shows that multiplication of Fourier transforms of functions in the Fourier plane is equivalent to convolution of those functions in the object plane. In system of FIG. 16A the Fourier transform of the electric field profile of light coming from a linear array phase modulator is multiplied by a filter having a sinusoidally varying optical density. This is equivalent to the convolution in the object plane of close-spaced positive and negative delta (or sine for practical cases) functions with the phase differences presented by modulator elements.

In FIG. 16A line segments 1605 represent elements of a linear array optical phase modulator. Lens 1610 is placed one focal length away from, and between, the phase modulator elements and an apodizing filter 1615. The filter has a sinusoidally varying optical density and a phase shift across half of its extent as described below. In FIG. 16B line segments 1655 represent elements of a linear array optical phase modulator. Lens 1660 is placed one focal length away from, and between, the phase modulator elements and Fourier plane 1665. A thick hologram 1670 is placed between the object plane (where the elements of the phase modulator lie) and the lens. Steven K. Case has pointed out ("Fourier processing in the object plane", Optics Letters, 4, 286-288, 1979) that Fourier processing that is normally carried out by placing masks in the Fourier plane of an optical system may also be carried out by placing a thick hologram in the object plane. He shows that the hologram is a linear filter that operates on the spatial frequency spectrum of the object wave. A high pass spatial frequency filter in the object plane is equivalent to differentiation in the Fourier plane. The relationship of FIG. 10A may be used to design an object plane hologram to create a desired Fourier plane mask.

Figure 17:
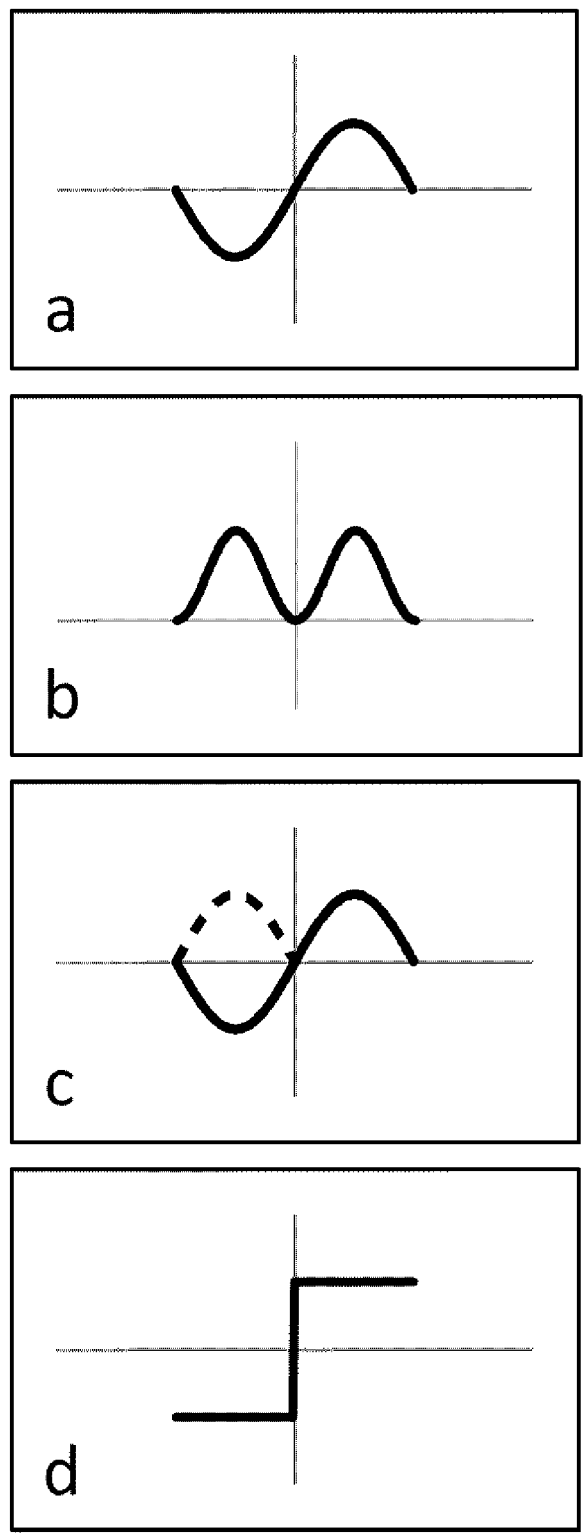
FIG. 17 illustrates various functional relationships to aid understanding of Fourier-plane discriminators.

We now consider how to construct an apodizing filter such as filter 1615. FIG. 17 illustrates various functional relationships to aid understanding of Fourier-plane discriminators. FIG. 17 shows four panels, a-d. Panel (a) shows the functional form of a sinusoidal electric field filter that, if placed in the Fourier plane of a system like that shown in FIG. 16A, would provide edge sampling behavior in the object plane of the system. Panel (b) shows the intensity profile corresponding to the field profile of panel (a); i.e. the function plotted in (b) is the square of that plotted in (a). Panel (c) compares the sinusoidal form of panel (a) (solid line) with the square root of the intensity profile of panel (b) (dotted line). In order to match the square root of intensity (c) to the sinusoidal form (a) an optical filter can be constructed from a plate having an optical density profile (b) combined with a phase shift as shown in (d). Profile (d) may be obtained by adding an extra thickness of glass to one half of a filter, for example. FIG. 17 shows functional relationships for constructing an apodizing filter for sine (phase difference) discrimination. This concept has been applied to astronomical observations by Oti, et al. ("The Optical Differentiation Coronagraph", Astrophysical Journal, 630, 631-636, 2005).

Figure 18:
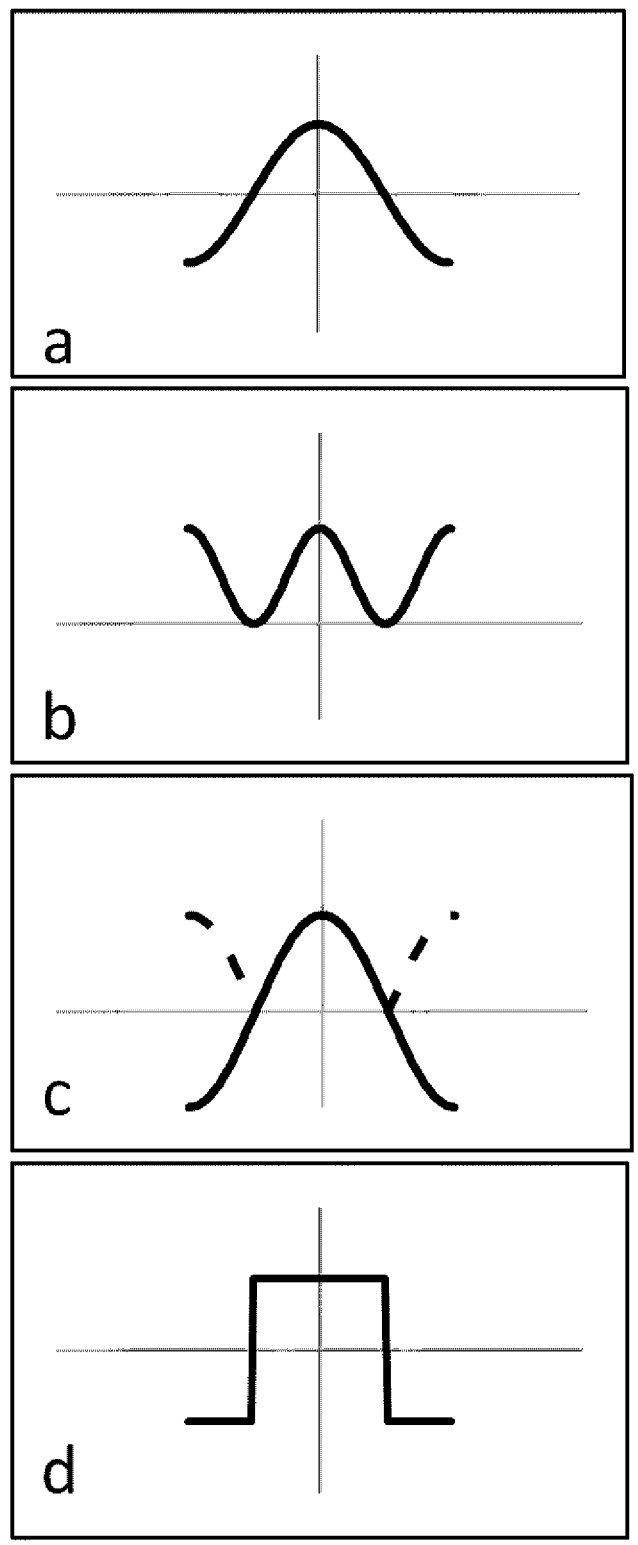
FIG. 18 illustrates various functional relationships to aid understanding of Fourier-plane discriminators.

Similar concepts may be used to construct a filter for cosine (phase similarity) discrimination as shown in FIG. 18 which also illustrates various functional relationships to aid understanding of Fourier-plane discriminators. FIG. 18 shows four panels, a-d. Panel (a) shows the functional form of a sinusoidal electric field filter that, if placed in the Fourier plane of a system like that shown in FIG. 16A would provide edge sampling behavior in the object plane of the system. Panel (b) shows the intensity profile corresponding to the field profile of panel (a); i.e. the function plotted in (b) is the square of that plotted in (a). Panel (c) compares the sinusoidal form of panel (a) (solid line) with the square root of the intensity profile of panel (b) (dotted line). In order to match the square root of intensity (c) to the sinusoidal form (a) an optical filter can be constructed from a plate having an optical density profile (b) combined with a phase shift as shown in (d). Profile (d) may be obtained by adding an extra thickness of glass to part of a filter, for example. FIG. 18 shows functional relationships for constructing an apodizing filter for cosine (phase similarity) discrimination.

Optical discriminators for converting a phase profile presented by a linear array phase modulator into an intensity profile forming a line image have been described for both polarized and unpolarized light. Further, discriminators can be designed with optical components placed in the object plane or the Fourier plane of an optical system.

Advanced Techniques

Interleaving line images, using two-dimensional arrays and using phase difference discriminators for other applications are examples of advanced techniques that are extensions of the principles described so far.

The display systems described so far produce (scanned) line images having the same number of pixels as modulator elements as the pixels are the result of phase differences created between adjacent elements. Interleaving techniques may be used to increase the number of pixels produced to twice the number of modulator elements.

Figure 19:
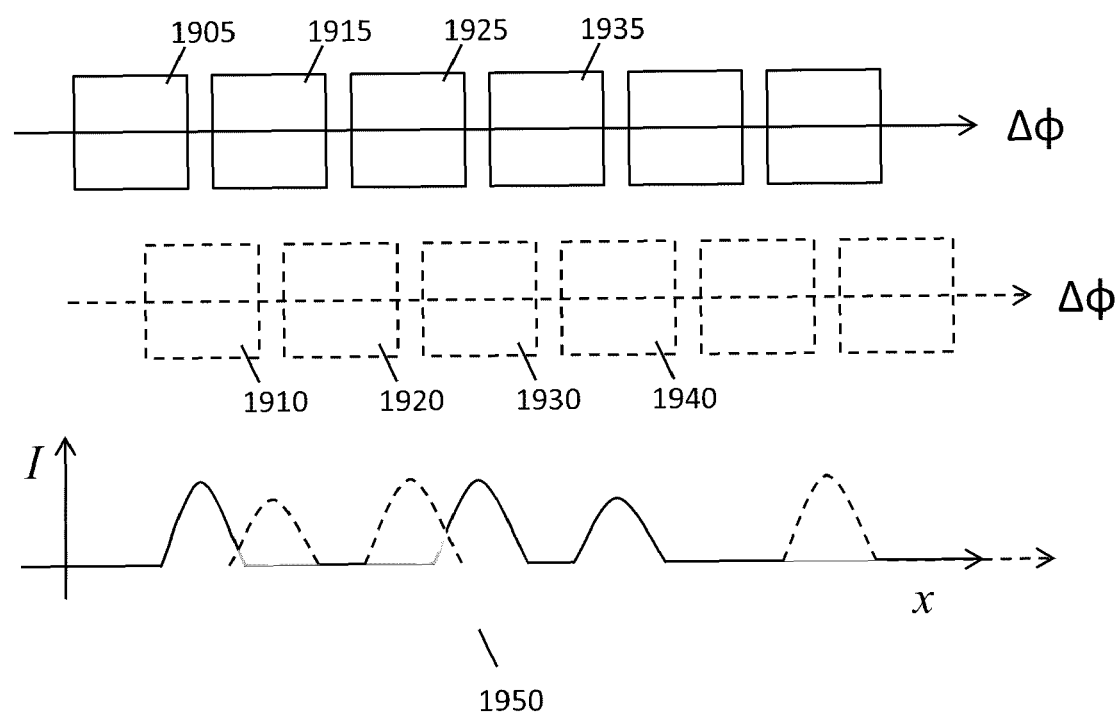
FIG. 19 shows the effect of shifting the output of a linear array on alternate scans.

FIG. 19 shows the effect of shifting the output of a linear array on alternate scans. In FIG. 19, squares such as 1905, 1915, 1925, 1935 represent elements of a linear array phase modulator. Differences in the phase of light originating from these elements are converted to pixel intensity plotted schematically on graph 1950 as solid lines. Pixel intensity is proportional to $\sin^2(\Delta\phi/2)$ where $\Delta\phi$ is the phase difference between array elements. Pixel intensity versus position along a line image such as that represented by graph 1950 is proportional to $\sin^2(x-\alpha)$ where '$\alpha$' represents the position of a particular pixel along the length of a linear array. If the elements of a phase modulator array are shifted by one half the element period, as represented by dashed squares 1910, 1920, 1930, 1940, for example, the corresponding pixels are interleaved with pixels created by an unshifted array. Intensities for these pixels are plotted on graph 1950 as dashed lines; they are proportional to $\cos^2(x-\alpha)$. Linear array optical phase modulators coupled with discriminators described herein can therefore create line images which may be smoothly interleaved. These images are composed of twice as many pixels as modulator elements.

Figure 20:
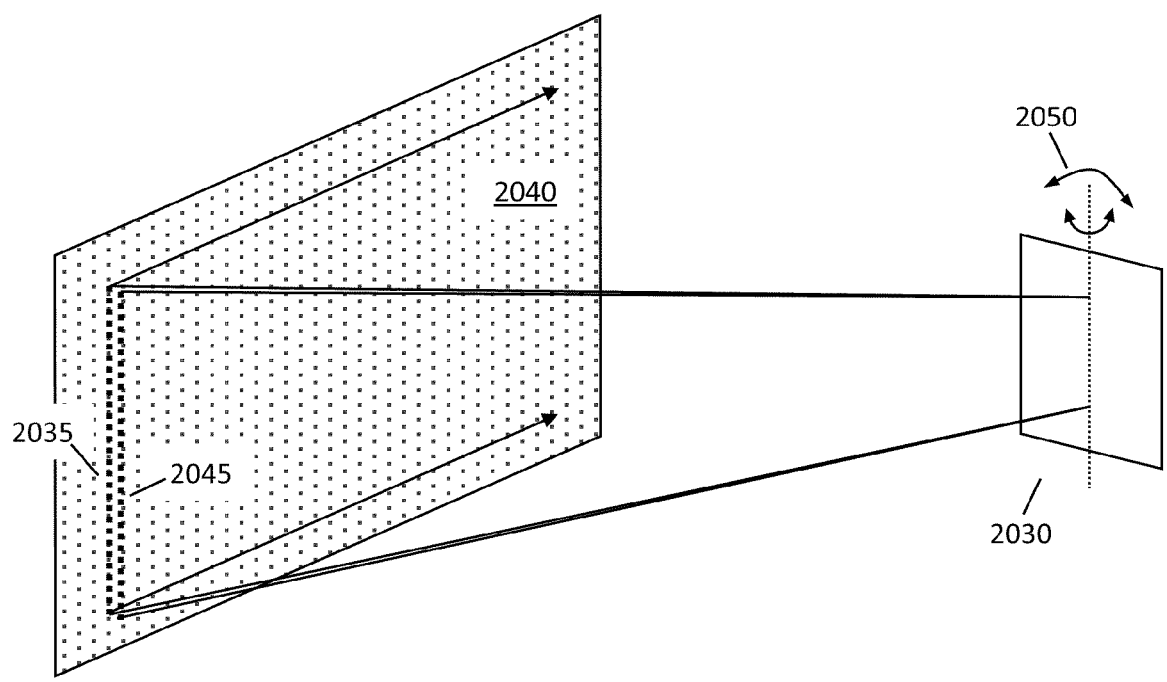
FIG. 20 shows one possible way to interleave successive scans of a linear array display system.

FIG. 20 shows one possible way to interleave successive scans of a linear array display system. In FIG. 20 scanner 2030 alternately sweeps line images 2035 and 2045 across surface 2040 for viewing or printing. Line images 2035 and 2045 may be interleaved by slightly tilting scanner 2030 parallel to the line images as indicated by arrow 2050. Other methods for interleaving include moving a linear phase modulator slightly between alternate positions for alternating line images. This may be accomplished, for example, by jogging a phase modulator with a piezo actuator.

So far the systems and methods described have been predicated on linear array optical phase modulators. However these systems and methods may be extended to two-dimensional phase modulators as well. A two-dimensional modulator may be considered to be an array of linear arrays. Phase difference (or phase similarity) discrimination may be applied along one dimension of a two-dimensional array while the other dimension of the array eliminates the need to scan a line image.

Figure 21:
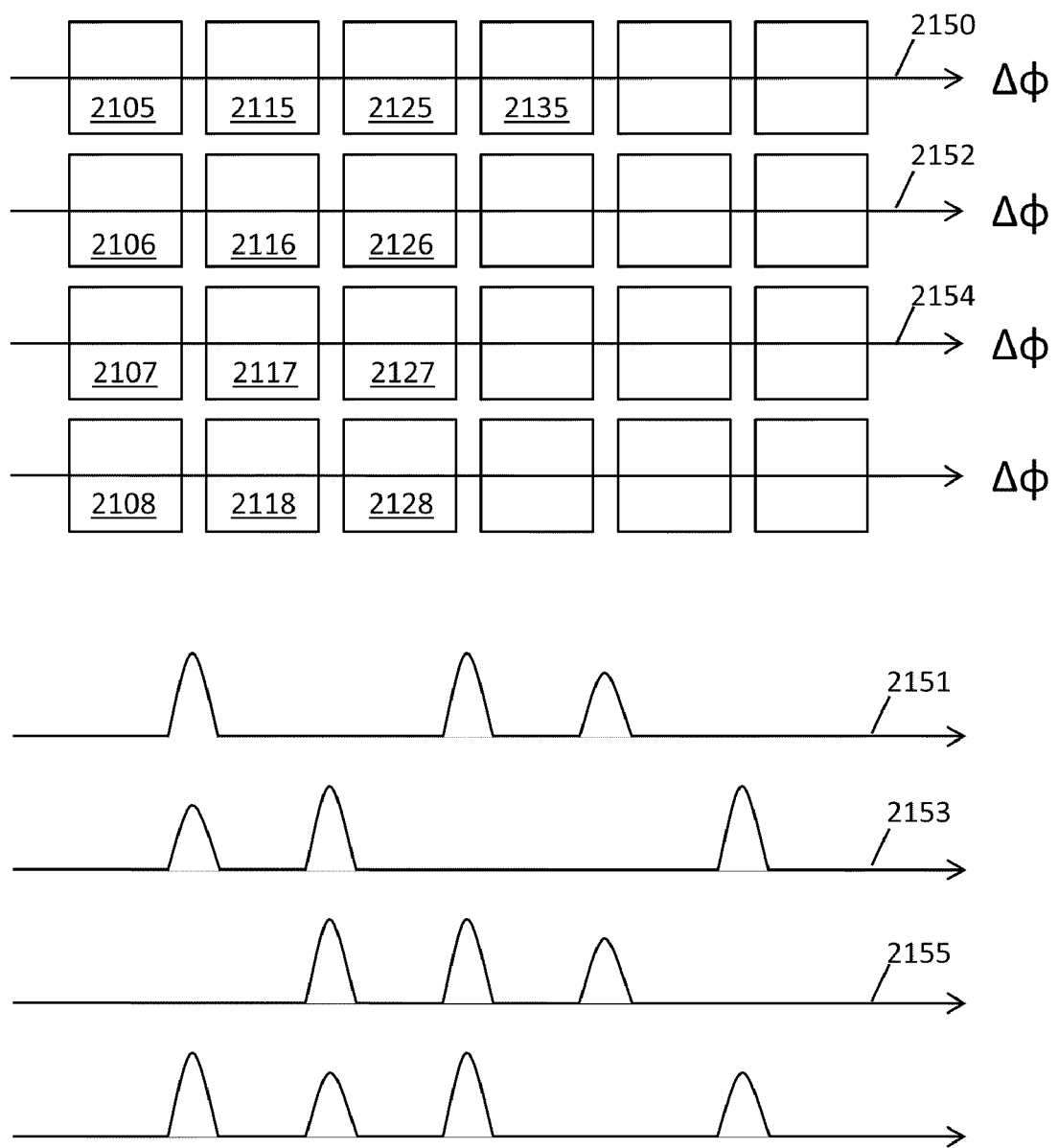
FIG. 21 illustrates how finite differencing may be applied to two-dimensional phase modulator arrays.

FIG. 21 illustrates how finite differencing may be applied to two-dimensional phase modulator arrays. In FIG. 21, squares 2105, 2115, 2125, 2135, etc., and 2106, 2107, 2108, etc., and 2116, 2117, 2118, etc., and 2126, 2127, 2128, etc. represent elements of a two-dimensional phase modulator array. An example of such an array is a liquid crystal phase modulator. When an optical phase difference discriminator is used to detect phase differences between elements along lines 2150, 2152, 2154, etc., a two-dimensional image is formed. Representative pixel intensities from such an image are plotted on axes 2151, 2153, 2155, etc. in the figure.

Figure 22:
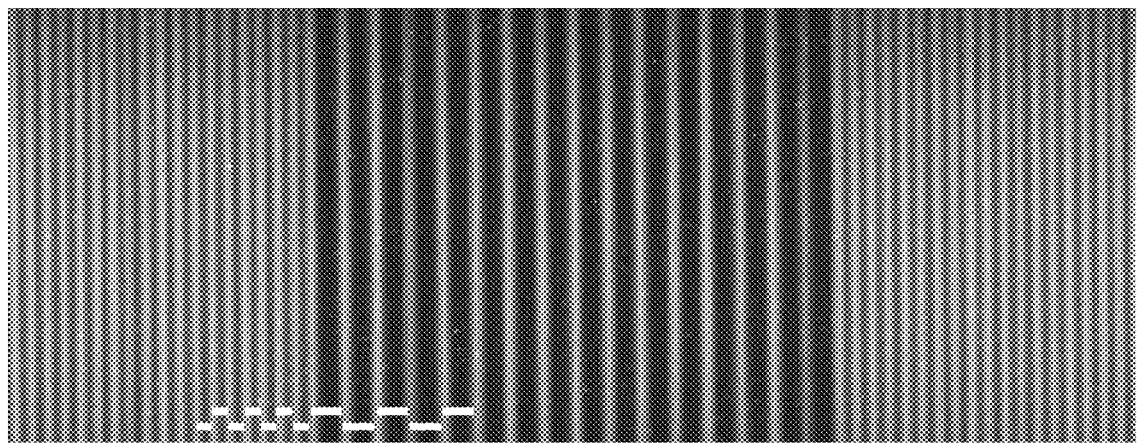
FIGS. 22A and 22B show experimentally obtained images of light output from linear array phase modulators.
Figure 22:
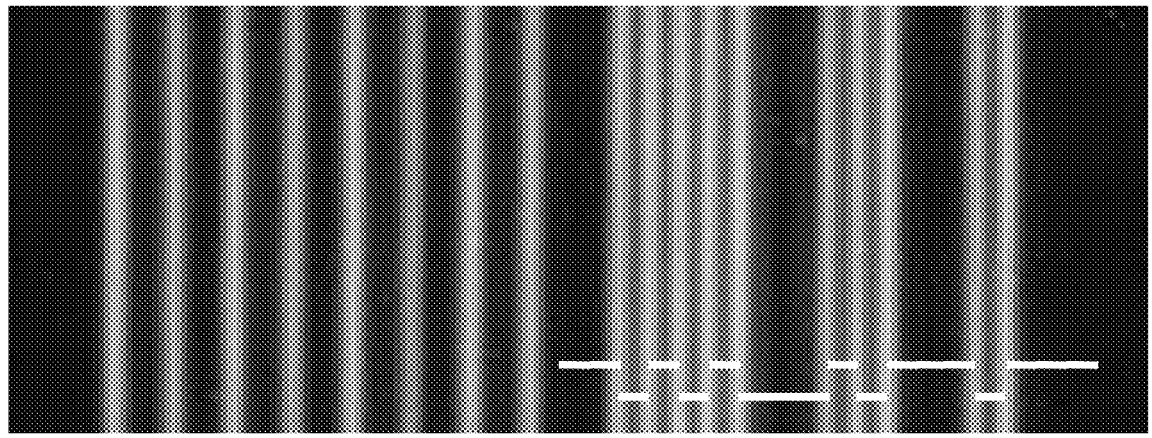

FIGS. 22A and 22B show experimentally obtained images of light output from linear array phase modulators. Experiments were performed with MEMS ribbon modulators having 3.7 μm pitch and enough travel (see, e.g. Δz in FIG. 3B) to create π phase shifts. Individual ribbon control allowed arbitrary patterns to be generated with a simple electronics system. In the figures, white bars are drawn superimposed on the measured light output to indicate the relative phase of light modulator elements corresponding to the pixels in the line images.

The optical discriminators described herein, especially in FIGS. 10, 11, 12, and 16, may be used for purposes other than display, printing and lithography. Such discriminators may be used for optical data storage readout, for example. Bits stored on optical discs (compact discs, video discs, etc.) are read out by optical systems that detect differences in light reflected from pits or lands on the disc. Phase difference discriminators described here may be used to read out several parallel channels of data from an optical disc, for example.

Display systems based on detecting phase differences between adjacent elements of a phase modulator have been described. These systems create as many pixels in a displayed image as elements in the phase modulator. In some cases twice as many pixels are created using interleaving techniques.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A display comprising:
a light source;
a phase modulator comprising a linear array of elements that modulate the phase of light generated by the light source;
an optical phase discriminator that converts phase differences between light from adjacent modulator elements into pixels of a line image; and,
a scanner that scans the line image to create a two-dimensional image.

2. The display of claim 1 wherein the light source is a laser.

3. The display of claim 1 wherein the light source is a light emitting diode.

4. The display of claim 1 wherein the light source is an arc lamp.

5. The display of claim 1 wherein the elements of the phase modulator are reflective.

6. The display of claim 5 wherein the elements of the phase modulator are micro-electromechanical ribbons.

7. The display of claim 1 wherein the elements of the phase modulator are transmissive.

8. The display of claim 7 wherein the elements of the phase modulator are liquid crystal modulators.

9. The display of claim 1 wherein the phase modulator lies in an object plane of the phase discriminator and the phase discriminator comprises a Savart plate.

10. The display of claim 1 wherein the phase modulator lies in an object plane of the phase discriminator and the phase discriminator comprises a Wollaston prism, the Wollaston prism operating in a Fourier plane of the phase discriminator.

11. The display of claim 1 wherein the phase modulator lies in an object plane of the phase discriminator and the phase discriminator comprises a thick hologram.

12. The display of claim 1 wherein the phase modulator lies in an object plane of the phase discriminator and the phase discriminator comprises an apodizing filter, the apodizing filter operating in a Fourier plane of the phase discriminator.

13. The display of claim 1 wherein the phase discriminator has an object plane impulse response $$h(x) = \left[\frac{1}{x_0}\mathrm{sinc}\left(\frac{1}{x_0}\left(x - \frac{p}{2}\right)\right) - \frac{1}{x_0}\mathrm{sinc}\left(\frac{1}{x_0}\left(x + \frac{p}{2}\right)\right)\right]$$

where p is a spatial period of elements in the phase modulator and $x_0$ is a constant.

14. The display of claim 1 wherein the phase discriminator has an object plane impulse response $$h(x) = \left[\frac{1}{x_0}\text{sinc}\left(\frac{1}{x_0}\left(x-\frac{p}{2}\right)\right) + \frac{1}{x_0}\text{sinc}\left(\frac{1}{x_0}\left(x+\frac{p}{2}\right)\right)\right]$$

where p is a spatial period of elements in the phase modulator and $x_0$ is a constant.

15. The display of claim 1 wherein the scanner is an oscillating mirror.

16. The display of claim 1 wherein the scanner is a rotating prism.

17. The display of claim 1 wherein the number of pixels in the line image is the same as the number of modulator elements.

18. The display of claim 1 wherein bright pixels in the line image correspond to non-zero phase differences between adjacent modulator elements.

19. The display of claim 1 wherein dark pixels in the line image correspond to non-zero phase differences between adjacent modulator elements.

20. The display of claim 1 wherein line images produced by successive scans of the scanner are interleaved by offsetting them parallel to the line images.

21. An optical system comprising:
a lens having an object plane and a Fourier plane;
a phase modulator located in the object plane, the modulator comprising a linear array of elements having spatial period, p, where each element is independently capable of changing the phase of light incident upon it;
optical components that sample the phase of light coming from the elements of the phase modulator, the components having an impulse response in the object plane given by:

$$h(x) = \left[\frac{1}{x_0}\text{sinc}\left(\frac{1}{x_0}\left(x-\frac{p}{2}\right)\right) - \frac{1}{x_0}\text{sinc}\left(\frac{1}{x_0}\left(x+\frac{p}{2}\right)\right)\right]$$

where x is a spatial coordinate parallel to the linear array and $x_0$ is a constant.

22. The system of claim 21 wherein the optical components comprise a Savart plate located between the phase modulator and the lens.

23. The system of Claire 21 wherein the optical components comprise a Wollaston prism located in the Fourier plane.

24. The system of claim 21 wherein the optical components comprise a thick hologram located between the phase modulator and the lens.

25. The system of claim 21 wherein the optical components comprise an apodizing filter located in the Fourier plane.

26. The system of claim 21 wherein the optical components have an impulse response in the Fourier plane that is a single-period sine function cut off at (±)

$$\frac{\lambda}{p}$$

where λ is the wavelength of light.

27. An optical system comprising:
a lens having an object plane and a Fourier plane;
a phase modulator located in the object plane, the modulator comprising a linear array of elements having spatial period, p, where each element is independently capable of changing the phase of light incident upon it;
optical components that sample the phase of light coming from the elements of the phase modulator, the components having an impulse response in the object plane given by:

$$h(x) = \left[\frac{1}{x_0}\text{sinc}\left(\frac{1}{x_0}\left(x-\frac{p}{2}\right)\right) + \frac{1}{x_0}\text{sinc}\left(\frac{1}{x_0}\left(x+\frac{p}{2}\right)\right)\right]$$

where x is a spatial coordinate parallel to the linear array and $x_0$ is a constant.

28. The system of claim 27 wherein the optical components comprise a Savart plate located between the phase modulator and the lens.

29. The system of claim 27 wherein the optical components comprise a Wollaston prism located in the Fourier plane.

30. The system of claim 27 wherein the optical components comprise a thick hologram located between the phase modulator and the lens.

31. The system of claim 27 wherein the optical components comprise an apodizing filter located in the Fourier plane.

32. The system of claim 27 wherein the optical components have an impulse response in the Fourier plane that is a single-period cosine function cut off at (±)

$$\frac{\lambda}{p}$$

where λ is the wavelength of light.

33. An optical system comprising:
a linear array phase modulator capable of creating a phase step profile along its length; and,
an optical phase discriminator that converts the phase step profile into a line image comprising bright and dark pixels; wherein,
pixels in the line image are mapped in the phase profile with non-return-to-zero, inverted coding.

34. A display comprising:
a light source;
a phase modulator comprising a two-dimensional array of elements that modulate the phase of light generated by the light source; and,
an optical phase discriminator that converts phase differences between light from modulator elements into pixels of a two-dimensional image.

35. The display of claim 34 wherein the two-dimensional array comprises an array of linear arrays and the phase differences are converted into pixel intensities via phase difference discrimination.

36. The display of claim 34 wherein the two-dimensional array comprises an array of linear arrays and the phase differences are converted into pixel intensities via phase similarity discrimination.

37. The display of claim 34 wherein the phase modulator is a liquid crystal phase modulator.

* * * * *